US011395557B2

(12) United States Patent
Rijskamp et al.

(10) Patent No.: US 11,395,557 B2
(45) Date of Patent: Jul. 26, 2022

(54) APPARATUS AND METHOD FOR PREPARING A BEVERAGE AND SYSTEM COMPRISING THE APPARATUS AND AN EXCHANGEABLE CAPSULE

(71) Applicant: KONINKLIJKE DOUWE EGBERTS B.V., Utrecht (NL)

(72) Inventors: Peter Rijskamp, Gaggio Montano (IT); Judith Margreet Hanneke Ogink, Putten (NL); Klaas Kooijker, Drachten (NL); Jarno Beekman, Drachten (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 602 days.

(21) Appl. No.: 16/265,957

(22) Filed: Feb. 1, 2019

(65) Prior Publication Data
US 2019/0335940 A1    Nov. 7, 2019

Related U.S. Application Data

(63) Continuation of application No. PCT/NL2017/050509, filed on Aug. 3, 2017.

(30) Foreign Application Priority Data

Aug. 3, 2016 (NL) ..................................... 2017277

(51) Int. Cl.
*A47J 31/36* (2006.01)
*A47J 31/40* (2006.01)
*B65D 85/804* (2006.01)

(52) U.S. Cl.
CPC ......... *A47J 31/3633* (2013.01); *A47J 31/407* (2013.01); *B65D 85/8043* (2013.01)

(58) Field of Classification Search
None
See application file for complete search history.

(56) References Cited

U.S. PATENT DOCUMENTS

| 4,775,048 A | 10/1988 | Baecchi |
| 4,787,299 A | 11/1988 | Levi |
| (Continued) | | |

FOREIGN PATENT DOCUMENTS

| AU | 2012356914 | 7/2014 |
| AU | 2013305155 | 3/2015 |
| (Continued) | | |

OTHER PUBLICATIONS

International Preliminary Report on Patentability, PCT/NL2017/050509, 7 pages (dated Feb. 5, 2019).
(Continued)

*Primary Examiner* — Ibrahime A Abraham
*Assistant Examiner* — Elizabeth M Sims
(74) *Attorney, Agent, or Firm* — Fitch, Even, Tabin & Flannery LLP

(57) ABSTRACT

An apparatus for preparing a quantity of beverage suitable for consumption, includes a first and a second brew chamber part to form a brew chamber for holding an exchangeable capsule as well as a fluid dispensing device for supplying an amount of fluid, such as water, under pressure to the exchangeable capsule. The first and the second brew chamber part are movable relative to each other between a first relative position, and a second relative position. The first relative position defines an open state in which the capsule can be inserted into the brew chamber. The second relative position defines a closed state allowing the brew chamber to enclose the capsule. A first biasing member biases the capsule towards the second brew chamber part. A second biasing biases the first brew chamber part and the second
(Continued)

brew chamber part towards each other. The first biasing member has a higher stiffness than the second biasing member. Also a system is provided comprising the apparatus as well as at least one capsule to be used by the apparatus.

19 Claims, 13 Drawing Sheets

(56) References Cited

U.S. PATENT DOCUMENTS

| | | |
|---|---|---|
| 5,197,374 A | 3/1993 | Fond |
| 5,343,799 A | 9/1994 | Fond |
| 5,964,142 A | 10/1999 | Tio |
| 6,026,732 A | 2/2000 | Kollep |
| 7,216,582 B2 | 5/2007 | Yoakim |
| 7,337,704 B2 | 3/2008 | Hammad |
| 7,607,385 B2 | 10/2009 | Halliday |
| 8,210,096 B2 | 7/2012 | Fin |
| 8,365,585 B2 | 2/2013 | Barra |
| 8,770,095 B2 | 7/2014 | Pecci |
| 8,836,956 B2 | 9/2014 | Jarisch |
| 8,904,922 B2 | 12/2014 | Pagano |
| 9,167,934 B2 | 10/2015 | Höglauer |
| 9,186,018 B2 | 11/2015 | Rotta |
| 9,439,532 B2 | 9/2016 | Crarer |
| 9,801,494 B2 | 10/2017 | Castellani |
| 9,986,869 B2 | 6/2018 | Bonacci |
| 2001/0011502 A1 | 8/2001 | Bonanno |
| 2001/0052294 A1 | 12/2001 | Schmed |
| 2002/0023543 A1 | 2/2002 | Schmed |
| 2003/0066431 A1 | 4/2003 | Fanzutti |
| 2004/0197444 A1 | 10/2004 | Halliday |
| 2005/0223904 A1 | 10/2005 | Laigneau |
| 2006/0075902 A1 | 4/2006 | Magno |
| 2006/0107841 A1 | 5/2006 | Schifferle |
| 2006/0174769 A1 | 8/2006 | Favre |
| 2006/0266224 A1 | 11/2006 | Hammad |
| 2008/0006159 A1 | 1/2008 | Fischer |
| 2008/0245236 A1 | 10/2008 | Ternite |
| 2010/0064899 A1 | 3/2010 | Aardenburg |
| 2011/0000377 A1 | 1/2011 | Favre |
| 2011/0142996 A1 | 6/2011 | Krueger |
| 2011/0183055 A1 | 7/2011 | Mariller |
| 2011/0185910 A1 | 8/2011 | Ryser |
| 2011/0277642 A1 | 11/2011 | Mariller |
| 2011/0297005 A1 | 12/2011 | Mariller |
| 2012/0240779 A1 | 9/2012 | Perentes |
| 2013/0099597 A1 | 4/2013 | Perentes |
| 2013/0220138 A1 | 8/2013 | Deuber |
| 2013/0247774 A1 | 9/2013 | Macchiavelli |
| 2013/0323366 A1 | 12/2013 | Gerbaulet |
| 2014/0053734 A1 | 2/2014 | Santi |
| 2014/0227414 A1 | 8/2014 | Perentes |
| 2014/0263780 A1 | 9/2014 | Day, Jr. |
| 2014/0290495 A1 | 10/2014 | Perentes |
| 2014/0299000 A1 | 10/2014 | Hanneson |
| 2015/0027375 A1 | 1/2015 | Cha |
| 2015/0059587 A1 | 3/2015 | Colleoni |
| 2015/0082989 A1 | 3/2015 | Besson |
| 2015/0104550 A1 | 4/2015 | Oh |
| 2015/0147448 A1 | 5/2015 | Lo Foro |
| 2015/0157169 A1 | 6/2015 | Krüger |
| 2015/0158665 A1 | 6/2015 | Krüger |
| 2015/0183577 A1 | 7/2015 | Talon |
| 2015/0225169 A1 | 8/2015 | Jarisch |
| 2015/0238039 A1 | 8/2015 | Fischer |
| 2015/0272375 A1 | 10/2015 | Flick |
| 2015/0272376 A1 | 10/2015 | Flick |
| 2015/0272380 A1 | 10/2015 | Flick |
| 2015/0342394 A1 | 12/2015 | Bonacci |
| 2016/0045060 A1 | 2/2016 | Flick |
| 2016/0150907 A1* | 6/2016 | Bolognese .......... A47J 31/0647 99/289 R |
| 2016/0157666 A1 | 6/2016 | Brandsma |
| 2016/0309946 A1 | 10/2016 | Gunstone |
| 2017/0143157 A1 | 5/2017 | Tentorio |
| 2019/0167031 A1 | 6/2019 | Rijskamp |
| 2019/0274467 A1 | 9/2019 | Ogink |
| 2019/0335942 A1 | 11/2019 | Rijskamp |
| 2019/0343324 A1 | 11/2019 | Rijskamp |
| 2019/0343325 A1 | 11/2019 | Ogink |
| 2020/0000265 A1 | 1/2020 | Ogink |
| 2020/0000268 A1 | 1/2020 | Ogink |
| 2020/0000271 A1 | 1/2020 | Ogink |

FOREIGN PATENT DOCUMENTS

| | | |
|---|---|---|
| CA | 2765324 | 11/2010 |
| CN | 1232212 | 10/1999 |
| CN | 1612831 | 5/2005 |
| CN | 101123905 | 2/2008 |
| CN | 101389551 | 3/2009 |
| CN | 100480150 | 4/2009 |
| CN | 201481108 | 5/2010 |
| CN | 101795605 | 8/2010 |
| CN | 102188161 | 9/2011 |
| CN | 102245065 | 11/2011 |
| CN | 103002781 | 3/2013 |
| CN | 103124509 | 5/2013 |
| CN | 202960135 | 6/2013 |
| CN | 103829804 | 6/2014 |
| CN | 104244780 | 12/2014 |
| CN | 104884368 | 9/2015 |
| CN | 105431358 | 3/2016 |
| CN | 105813958 | 7/2016 |
| DE | 10334526 | 2/2005 |
| DE | 202007002910 | 5/2007 |
| DE | 102005049624 | 7/2007 |
| DE | 202012005191 | 6/2012 |
| DE | 102012010394 | 11/2013 |
| DE | 202015100812 | 5/2016 |
| DE | 202015100813 | 5/2016 |
| DE | 202015100814 | 5/2016 |
| DE | 202015101266 | 6/2016 |
| EP | 0449533 | 10/1991 |
| EP | 0451980 | 10/1991 |
| EP | 1183975 | 3/2002 |
| EP | 1208782 | 5/2002 |
| EP | 1360919 | 11/2003 |
| EP | 1518484 | 3/2005 |
| EP | 1555219 | 7/2005 |
| EP | 1559351 | 8/2005 |
| EP | 1767129 | 3/2007 |
| EP | 1842467 | 10/2007 |
| EP | 1859713 | 11/2007 |
| EP | 1859714 B1 | 11/2007 |
| EP | 2033551 | 3/2009 |
| EP | 2071986 | 6/2009 |
| EP | 2071987 | 6/2009 |
| EP | 2230195 A1 | 9/2010 |
| EP | 2250950 | 11/2010 |
| EP | 2374383 B1 | 11/2011 |
| EP | 2409608 | 1/2012 |
| EP | 2409609 | 1/2012 |
| EP | 2471420 | 7/2012 |
| EP | 2656755 | 10/2013 |
| EP | 2687133 | 1/2014 |
| JP | H5192246 A | 8/1993 |
| JP | 2006528507 A | 12/2006 |
| JP | 2009531099 A | 9/2009 |
| JP | 2014138892 | 7/2014 |
| JP | 2015506787 A | 3/2015 |
| JP | 2015512739 A | 4/2015 |
| RU | 2012128493 A | 1/2014 |
| RU | 2591768 C2 | 7/2016 |
| RU | 2626940 | 8/2017 |
| WO | 2000042891 | 7/2000 |
| WO | 0243541 | 6/2002 |
| WO | 2005016092 | 2/2005 |
| WO | 2006005736 | 1/2006 |
| WO | 2006014936 | 2/2006 |
| WO | 2006066625 | 6/2006 |
| WO | 2007012206 | 2/2007 |

(56) References Cited

FOREIGN PATENT DOCUMENTS

| | | |
|---|---|---|
| WO | 2007016977 | 2/2007 |
| WO | 2007096196 | 8/2007 |
| WO | 2007113100 | 10/2007 |
| WO | 2007122206 | 11/2007 |
| WO | 2008004116 | 1/2008 |
| WO | 2008096385 | 8/2008 |
| WO | 2009016455 | 2/2009 |
| WO | 2009027131 | 3/2009 |
| WO | 2010013274 | 2/2010 |
| WO | 2010029512 | 3/2010 |
| WO | 2010076698 | 7/2010 |
| WO | 2010134054 | 11/2010 |
| WO | 2010137953 | 12/2010 |
| WO | 2010137954 | 12/2010 |
| WO | 2010137956 | 12/2010 |
| WO | 2011015978 | 2/2011 |
| WO | 2011042401 | 4/2011 |
| WO | 2011069829 | 6/2011 |
| WO | 2011069830 | 6/2011 |
| WO | 2011073310 | 6/2011 |
| WO | 2011076750 | 6/2011 |
| WO | 2011113854 A2 | 9/2011 |
| WO | 2011121125 | 10/2011 |
| WO | 2012001115 | 1/2012 |
| WO | 2012123440 | 9/2012 |
| WO | 2012156167 | 11/2012 |
| WO | 2013007776 | 1/2013 |
| WO | 2013008012 | 1/2013 |
| WO | 2013079814 | 6/2013 |
| WO | 2013092910 | 6/2013 |
| WO | 2013119543 | 8/2013 |
| WO | 2013144922 | 10/2013 |
| WO | 2014012778 | 1/2014 |
| WO | 2014012779 | 1/2014 |
| WO | 2014016741 | 1/2014 |
| WO | 2014027079 | 2/2014 |
| WO | 2014029685 | 2/2014 |
| WO | 2014041605 | 3/2014 |
| WO | 2014056641 | 4/2014 |
| WO | 2014056642 | 4/2014 |
| WO | 2014056730 | 4/2014 |
| WO | 2014056810 | 4/2014 |
| WO | 2014056821 | 4/2014 |
| WO | 2014056862 | 4/2014 |
| WO | 2014060370 | 4/2014 |
| WO | 2014082975 | 6/2014 |
| WO | 2014082976 | 6/2014 |
| WO | 2014092406 | 6/2014 |
| WO | 2014096120 | 6/2014 |
| WO | 2014096121 | 6/2014 |
| WO | 2014132158 | 9/2014 |
| WO | 2014174462 | 10/2014 |
| WO | 2014183219 | 11/2014 |
| WO | 2014183783 | 11/2014 |
| WO | 2015004613 | 1/2015 |
| WO | 2015056022 | 4/2015 |
| WO | 2015082662 | 6/2015 |
| WO | 2015082663 | 6/2015 |
| WO | 2015082664 | 6/2015 |
| WO | 2015086371 | 6/2015 |
| WO | 2015109052 | 7/2015 |
| WO | 2015124627 | 8/2015 |
| WO | 2015144356 | 10/2015 |
| WO | 2015155145 | 10/2015 |
| WO | 2015158838 | 10/2015 |
| WO | 2015173123 | 11/2015 |
| WO | 2015193744 | 12/2015 |
| WO | 2016012562 | 1/2016 |
| WO | 2016055633 | 4/2016 |
| WO | 2016071795 | 5/2016 |
| WO | 2016082029 | 6/2016 |

OTHER PUBLICATIONS

International Preliminary Report on Patentability, PCT/NL2017/050510, 7 pages (dated Feb. 5, 2019).
International Preliminary Report on Patentability, PCT/NL2017/050511, 7 pages (dated Feb. 5, 2019).
International Preliminary Report on Patentability, PCT/NL2017/050512, 6 pages (dated Feb. 5, 2019).
International Preliminary Report on Patentability, PCT/NL2017/050513, 6 pages (dated Feb. 5, 2019).
International Preliminary Report on Patentability, PCT/NL2017/050514, 6 pages (dated Feb. 5, 2019).
International Preliminary Report on Patentability, PCT/NL2017/050515, 6 pages (dated Feb. 5, 2019).
International Preliminary Report on Patentability, PCT/NL2017/050519, 9 pages (dated Feb. 5, 2019).
International Preliminary Report on Patentability, PCT/NL2017/050521, 5 pages (dated Feb. 5, 2019).
International Preliminary Report on Patentability, PCT/NL2017/050522, 12 pages (dated Feb. 5, 2019).
International Search Report and Written Opinion, PCT/NL2017/050509, 11 pages (dated Jun. 5, 2018).
International Search Report and Written Opinion, PCT/NL2017/050510, 10 pages (dated Nov. 20, 2017).
International Search Report and Written Opinion, PCT/NL2017/050511, 9 pages (dated Nov. 30, 2017).
International Search Report and Written Opinion, PCT/NL2017/050512, 10 pages (dated Nov. 27, 2017).
International Search Report and Written Opinion, PCT/NL2017/050513, 8 pages (dated Dec. 22, 2017).
International Search Report and Written Opinion, PCT/NL2017/050514, 8 pages (dated Nov. 23, 2017).
International Search Report and Written Opinion, PCT/NL2017/050515, 10 pages (dated Nov. 27, 2017).
International Search Report and Written Opinion, PCT/NL2017/050519, 11 pages (dated Nov. 29, 2017).
International Search Report and Written Opinion, PCT/NL2017/050521, 8 pages (dated Dec. 4, 2017).
International Search Report and Written Opinion, PCT/NL2017/050522, 17 pages (dated Jan. 17, 2018).
Manual Jura Nespresso English, 22 pages.
Nespresso—I, 8 pages.
Nespresso—II, 2 pages (2003).
Nespresso—III, 2 pages (2003).
Nespresso—IV, 7 pages.
Nespresso—V, 5 pages (Apr. 2015).

* cited by examiner

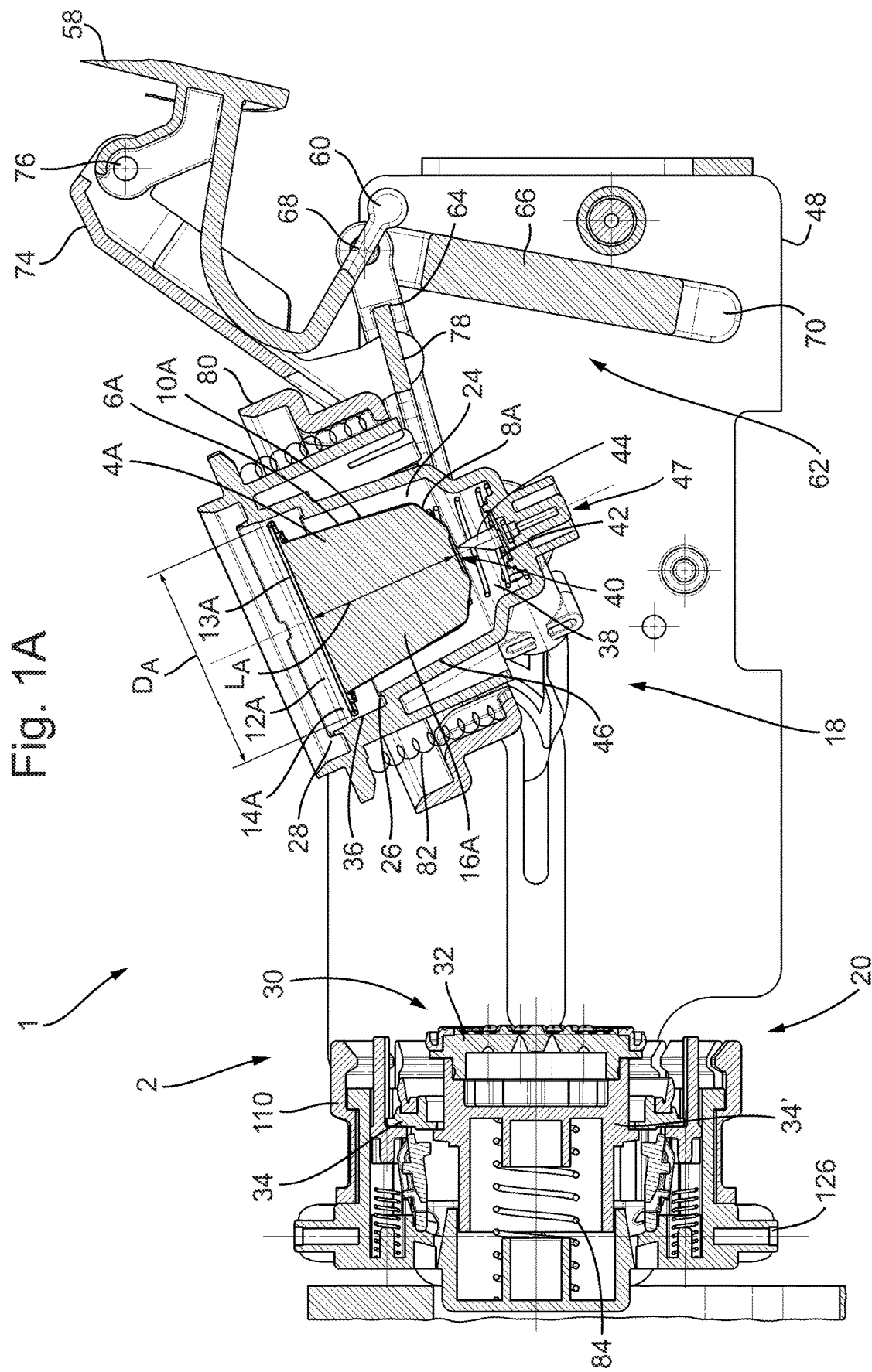

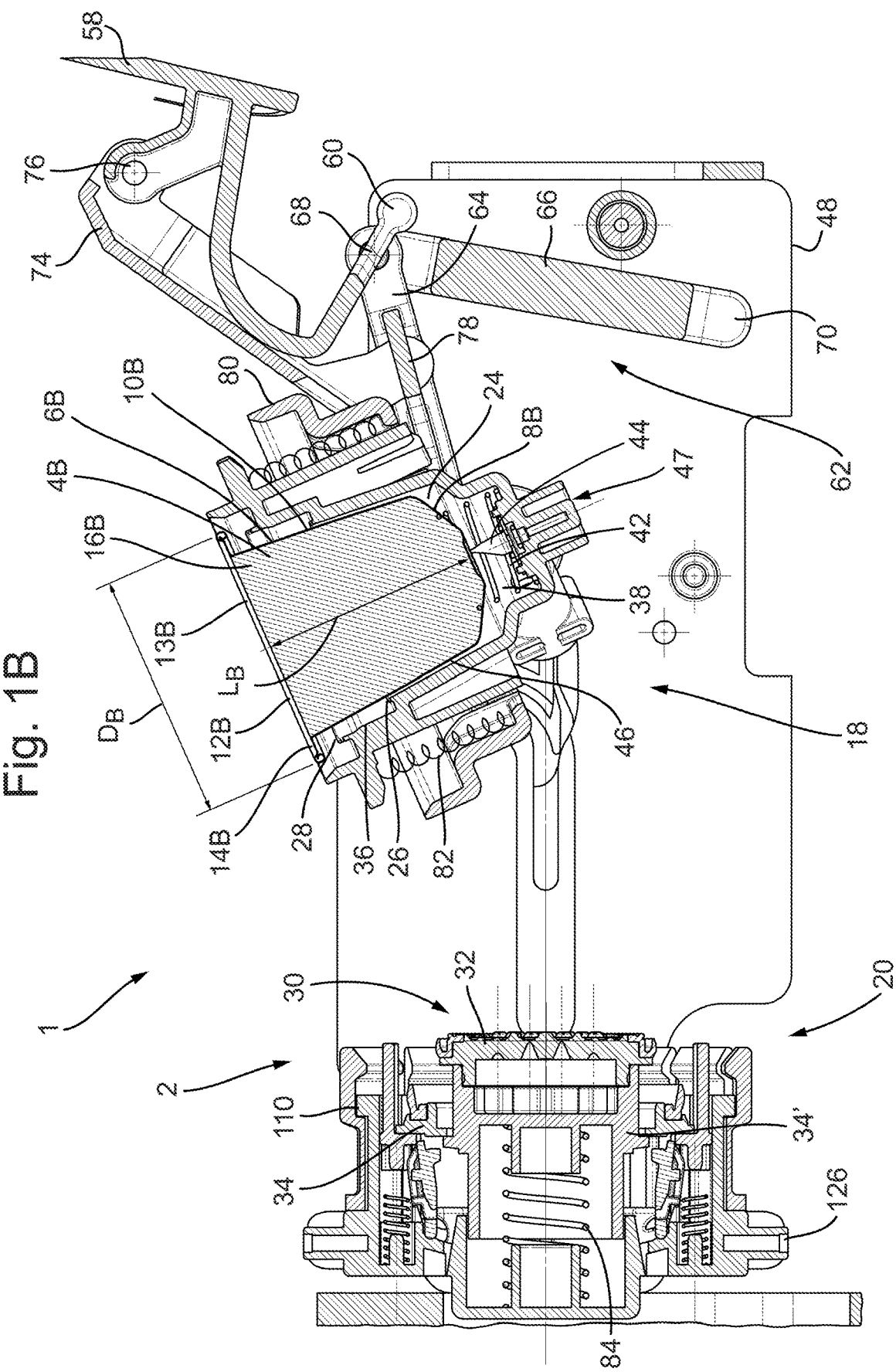

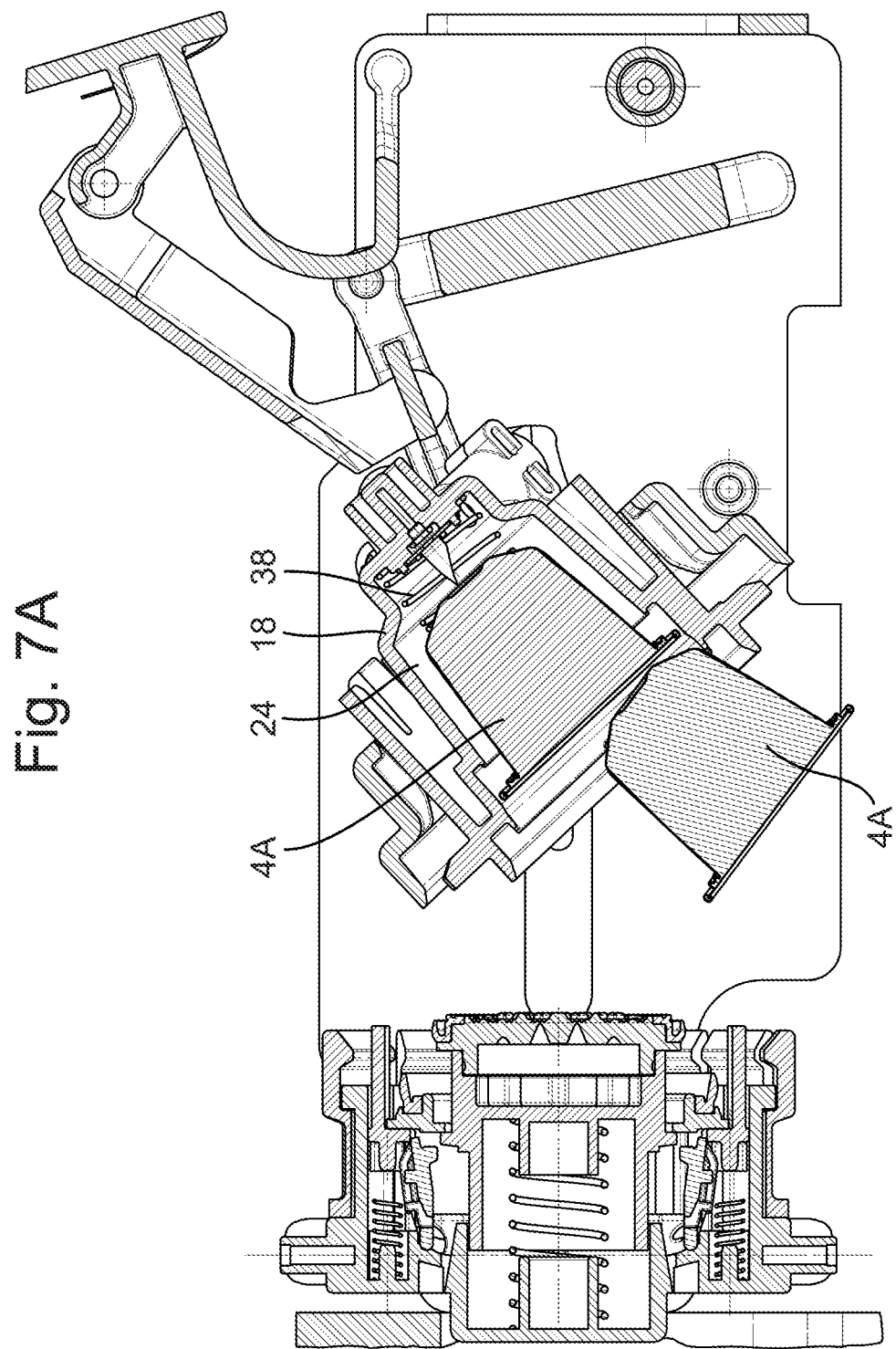

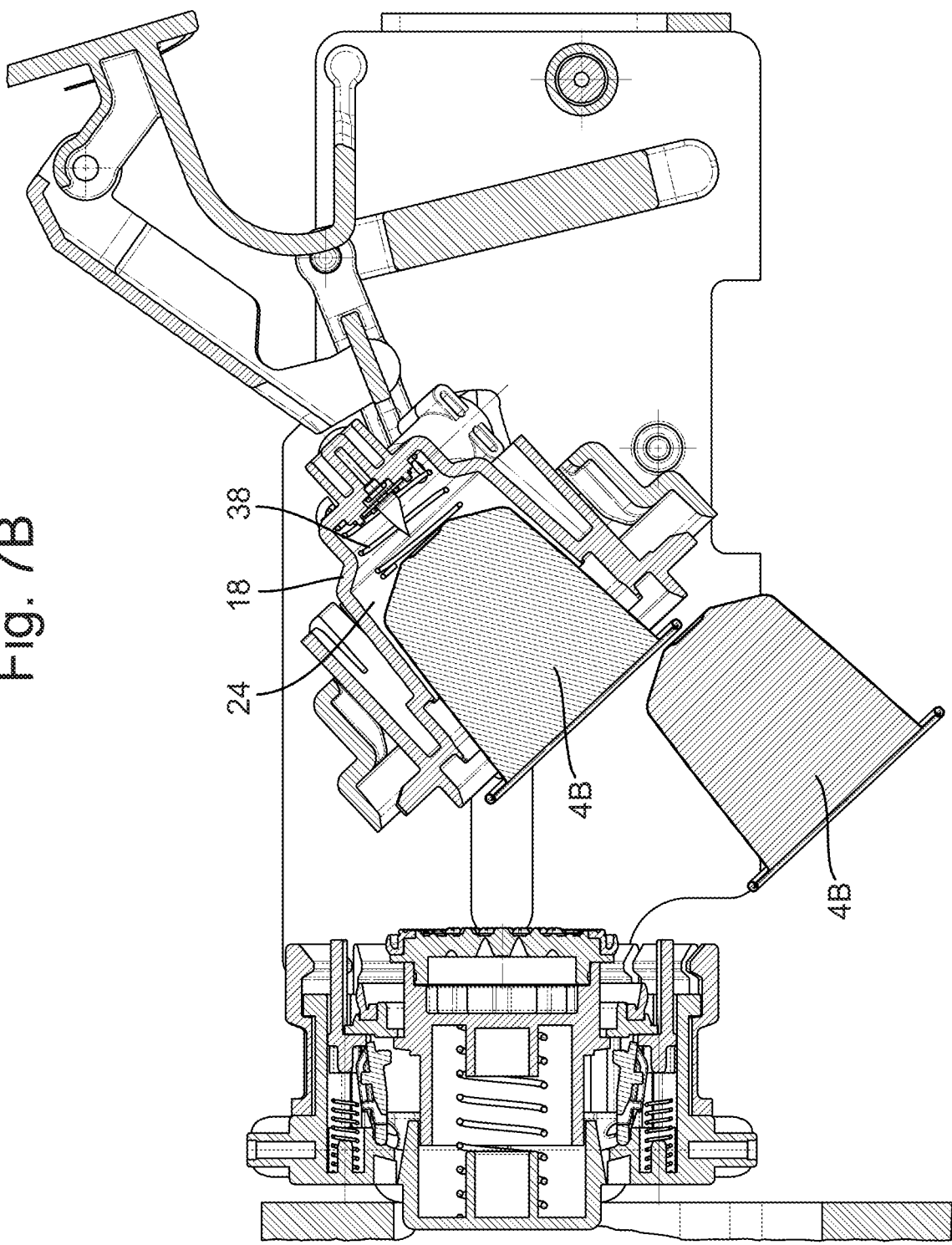

APPARATUS AND METHOD FOR PREPARING A BEVERAGE AND SYSTEM COMPRISING THE APPARATUS AND AN EXCHANGEABLE CAPSULE

CROSS-REFERENCE TO RELATED APPLICATIONS

This application is a continuation of PCT/NL2017/050509 filed Aug. 3, 2017, which claims the benefit of and priority to Netherlands Patent Application No. NL 2017277, filed Aug. 3, 2016, the entire contents of each of which are hereby incorporated herein by reference.

BACKGROUND

The invention generally relates to a system for preparing a beverage. The invention also relates to an apparatus and method for preparing a beverage. More specifically the invention relates to a system for preparing a beverage using a capsule.

Beverage preparation systems are known comprising an exchangeable capsule and an apparatus including a first brew chamber part and a second brew chamber part forming a brew chamber for holding the exchangeable capsule, and a fluid dispensing device for supplying an amount of fluid, such as water, under pressure to the exchangeable capsule. The first brew chamber part and the second brew chamber part are movable with respect to another, so that they can provide for an open position wherein the exchangeable capsule can be inserted into one of the brew chamber parts and a closed position, wherein the first brew chamber part and the second brew chamber part form the brew chamber enclosing the exchangeable capsule. The movement from the open position to the closed position is typically used to prepare the exchangeable capsule for use in the brewing process, e.g. during this movement the exchangeable capsule may be forced into a final position inside the brewing chamber to be formed from its original position where it was inserted by the user. Also the exchangeable capsule may be pierced during this movement, so as to enable the fluid dispensing device to supply an amount of fluid. It is a disadvantage of known beverage preparation systems that the way in which the exchangeable capsule is prepared depends on the material used for the exchangeable capsule. For example aluminum exchangeable capsules tend to be relatively easily pierced as compared to polymer exchangeable capsules. Polymer exchangeable capsules on the other hand may have a higher flexibility allowing them to be more easily positioned. Accordingly the way in which an exchangeable capsule is prepared may depend on the material of which it is made.

SUMMARY

It is an object of the present invention to provide an apparatus for preparing a beverage wherein it is avoided that a material of the exchangeable capsule affects the process of its preparation for brewing.

It is a further object of the present invention to provide method for preparing a beverage wherein it is avoided that a material of the exchangeable capsule affects the process of its preparation for brewing.

It is a still further object of the present invention to provide a system for preparing a beverage wherein it is avoided that a material of the exchangeable capsule affects the process of its preparation for brewing.

According to a first aspect of the invention an apparatus is provided for preparing a quantity of beverage suitable for consumption, including a first brew chamber part and a second brew chamber part forming a brew chamber for holding an exchangeable capsule. The apparatus further includes a fluid dispensing device for supplying an amount of fluid, such as water, under pressure to the exchangeable capsule. The first relative position of the brew chamber parts defines an open state in which the capsule can be inserted into the brew chamber. The second relative position defines a closed state allowing the brew chamber to enclose the capsule. The second biasing member allows to the brew chamber parts to move relative to each other, but biases the brew chamber parts in each others direction. When moving the brew chamber parts from their first relative position to their second relative position using an external actuating mechanism e.g. a user driven actuator, such as a handle or an electro-mechanical actuator the second biasing member will allow the brew chamber parts to yield with respect to each other if the abutting force between the brew chamber parts exceeds the biasing force of the biasing member provided that a dynamic range of the biasing member is not exceeded. Also, during this movement from the first relative position to the second relative position the first biasing member biases the capsule towards the second brew chamber part. As the first biasing member has a higher stiffness than the second biasing member, the capsule will remain biased towards the second brew chamber part during the closing movement, until the second biasing member exceeds its dynamic range or a mechanical stop is encountered.

As a result, the brew chamber will first assume its closed state before the capsule is fully inserted into the first brew chamber part. A biasing member, such as the first or second basing member may be provided in various ways. For example as a resilient element, like a leaf spring or a helical spring, a biasing member may exert a pushing or a pulling force on the part to be biased. Other example of biasing members are a pneumatic spring and a pair of magnetic elements.

According to an aspect a method is provided for preparing a quantity of beverage suitable for consumption. The method includes:

providing a first brew chamber part and a second brew chamber part, which first brew chamber part and second brew chamber part are movable with respect to each other between an open state, allowing for insertion of an exchangeable capsule and a closed state wherein the first brew chamber part and the second brew chamber part form a brew chamber for holding an exchangeable capsule, providing a fluid dispensing device for supplying an amount of fluid, such as water, under pressure to the exchangeable capsule in said closed state;

biasing the exchangeable capsule away from the first brew chamber part (first biasing direction) with a first force and biasing the second brew chamber part towards the first brew chamber part (second direction) with a second force, wherein said second force exerted upon a first displacement of the exchangeable capsule towards the first brew chamber part is stronger than the first force exerted upon a displacement having the same magnitude as said first displacement of the first brew chamber part towards the second brew chamber part.

Depending on the application the movement between the first and the second relative positions may be achieved in that one of the brew chamber parts has a fixed absolute position within the apparatus and the other one of the brew chamber parts is movable within the apparatus. In an embodiment the first brew chamber part is movable between a first absolute position defining its loading position to be assumed in said first relative position with the second brew chamber part and a second absolute position defining its brewing position to be assumed in said second relative position with the second brew chamber part. In an alternative embodiment the second brew chamber part is movable between a first absolute position defining its loading position to be assumed in said first relative position with the first brew chamber part and a second absolute position defining its brewing position to be assumed in said second relative position with the first brew chamber part. An embodiment having only one movable brew chamber part is favorable in view of relatively low manufacturing costs.

Alternatively both brew chamber parts may be movably arranged in the apparatus. Therein, the first brew chamber part is movable in the apparatus between a proper loading position and a proper brewing position. In addition the second brew chamber part is movable in the apparatus between a proper loading position and a proper brewing position. This embodiment wherein both brew chamber parts are movably arranged in the apparatus renders the apparatus applicable for a wider range of exchangeable capsules.

Whether or not the brew chamber parts each are movable within the apparatus or only one thereof is movable, various options are possible for biasing the brew chamber parts towards one another. In an embodiment the second biasing member includes a biasing member for biasing the first brew chamber part in a direction towards said second brew chamber part. In another embodiment the second biasing member includes a biasing member for biasing the second brew chamber part in a direction towards said first brew chamber part. Also a combination of these both types of biasing elements may be applied. The biasing elements may serve an additional purpose, for example to position a locking member or a sealing member.

According to an aspect the brew chamber is arranged for selectively holding a first exchangeable capsule and a second exchangeable capsule as the exchangeable capsule, the second exchangeable capsule being different from the first exchangeable capsule. The second brew chamber part may be movable into one of a first brewing position and a second brewing position as its brewing position. The first brew chamber part in its brewing position together with the second brew chamber part in its first brewing position defines a closed state in which the first exchangeable capsule fits in the brew chamber. The first brew chamber part in its brewing position together with the second brew chamber part in its second brewing position defines a closed state in which the second exchangeable capsule fits in the brew chamber. It can be achieved that a preparation process of a first exchangeable capsule during transition of the brewing chamber from its open state to its closed state is similar to the preparation process of a second exchangeable capsule during that transition.

Optionally, the cavity of the first brew chamber part is arranged for receiving the first or second capsule. The cavity of the first brew chamber part can be a predetermined cavity arranged for holding the first or second capsule. The cavity can have an invariable shape for holding the first or second capsule. The first brew chamber part can be arranged for holding the first or second capsule without changing a configuration of the first brew chamber part. The first brew chamber part can be a monolithic part.

According to an aspect, the system includes a locking unit arranged for selectively locking the second brew chamber part in or near the first brewing position. The first brewing position of the second brew chamber part may coincide with its loading position. This is advantageous in that the second brew chamber part does not need to be displaced when a first exchangeable capsule is loaded and subsequently the brew chamber is brought into its second relative position. In that case the basing of the first and second brew chamber parts to each other may be provided by a biasing member coupled to the first brew chamber part.

According to an aspect the first and the second exchangeable capsule to be selectively used by the apparatus may differ from each other in that the first exchangeable capsule has a first body with a first flange, and the second exchangeable capsule has a second body with a second flange, wherein the second flange has a larger diameter than the first flange. In an embodiment of the apparatus using these mutually different first and second capsules the first brew chamber part has a cavity for selectively holding one of the first and second exchangeable capsules. The brew chamber part of this embodiment may have a first substantial annular abutment surface in the cavity, and having a second substantial annular abutment surface. wherein the first abutment surface is arranged for abutting the first flange thereagainst when the cavity holds the first exchangeable capsule, and wherein the second abutment surface is arranged for abutting the second flange thereagainst when the cavity holds the second exchangeable capsule. Therewith the apparatus can properly operate with both capsules despite their different size of flange. In an embodiment of this aspect, the first substantially annular abutment surface is spaced from the second substantially annular abutment surface in an axial direction of the first brew chamber part. Therewith it can be achieved that a bottom of the first exchangeable capsule and a bottom of the second exchangeable capsule have a predetermined position relative to a bottom of the cavity of the first brew chamber part when loaded into the first brew chamber part. Therewith the preparation process of these first and second exchangeable capsules can be harmonized.

According to an aspect an extraction plate of the second brew chamber part may include a central portion and a peripheral portion, wherein the central portion is movable relative to the peripheral portion in an axial direction. Therewith the first brew chamber part can assume the same position in a closed state of the brew chamber, regardless whether it holds a first or a second exchangeable capsule.

In an embodiment the central portion includes a first sealing member and the peripheral portion includes a second sealing member. The first sealing member is arranged for providing a fluid sealing engagement between the central portion and the first brew chamber part when forming the brew chamber for holding the first exchangeable capsule. When forming the brew chamber for holding the second exchangeable capsule the second sealing member provides for a fluid sealing engagement between the peripheral portion and the first brew chamber part.

In an alternative embodiment the first sealing member provides for a fluid sealing engagement between the central portion and a portion of the first capsule facing the second brew chamber part when the brew chamber holds the first exchangeable capsule. Therein the peripheral portion includes a second sealing member arranged for providing a fluid sealing engagement between the peripheral portion and a portion of the second capsule facing the second brew chamber part when the brew chamber holds the second exchangeable capsule.

According to an aspect in order to minimize waste fluid, an embodiment is provided wherein the first brew chamber part includes a first volume not occupied by the first exchangeable capsule when the brew chamber holds the first exchangeable capsule, which first volume is arranged for holding part of the second exchangeable capsule when the brew chamber holds the second capsule. Analogously the first brew chamber part includes a second volume not occupied by the second exchangeable capsule when the brew chamber holds the second capsule, which second volume is arranged for receiving the second brew chamber part when the brew chamber holds the first capsule.

According to an aspect in order to have similar operating conditions regardless whether the apparatus uses a small exchangeable capsule or a large exchangeable capsule, an embodiment is provided wherein the apparatus includes an extraction plate having a plurality of relief elements for selectively engaging one of a first exit area defined by the small exchangeable capsule and second exit area defined by the large exchangeable capsule. When brewing, the fluid dispensing device of the apparatus supplies an amount of fluid, such as water, under pressure to a selected one of the exchangeable capsules, so as to press its exit area onto the relief elements, for opening the exit area. Embodiments may be contemplated wherein the extraction plate and the second exit area are adapted to each other such that a flow resistance of the second exit area when opened is less than a flow resistance of the first exit area when opened.

According to an aspect the first brew chamber part and the first exchangeable capsule are adapted to each other such that a flange-like rim of the first exchangeable capsule engages an inner circumferential wall of the first brew chamber part when loading the first exchangeable capsule into the first brew chamber part. Furthermore, the first brew chamber part and the second exchangeable capsule are adapted to each other such that an outer part of the second exchangeable capsule engages the inner circumferential wall of the first brew chamber part when loading the second exchangeable capsule into the first brew chamber part. This further facilitates operation of the apparatus as part of a system with mutually different first and second exchangeable capsules.

According to an aspect a system is provided for preparing a quantity of beverage suitable for consumption, including the apparatus according to the first aspect and/or according to any of the other aspects as specified above or a combination of such aspects and further including at least one exchangeable capsule.

According to an aspect of the system the at least one exchangeable capsule is a first exchangeable capsule and the system at least comprises a second exchangeable capsule that differs from the first exchangeable capsule, the brew chamber being for selectively holding one of the first and second exchangeable capsules.

It will be appreciated that any of the embodiments, aspects, features and options described in view of the apparatus apply equally to the system, capsules and method. It will also be clear that any one or more of the above embodiments, aspects, features and options can be combined.

BRIEF DESCRIPTION OF THE DRAWINGS

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing:

FIGS. 1A and 1B show schematic representations of a system, therein FIG. 1A shows the system formed of an apparatus and a first exchangeable capsule, and FIG. 1B shows the system formed of the apparatus and a second exchangeable capsule, FIG. 2A shows a perspective view and FIG. 2B shows a side view, FIG. 3A shows the apparatus in a ready position for the first exchangeable capsule and FIG. 3B shows the apparatus in a brewing position for the first exchangeable capsule, FIG. 4A shows the apparatus in a ready position for the second exchangeable capsule and FIG. 4B shows the apparatus in a brewing position for the second exchangeable capsule, FIGS. 5A-5C demonstrate functioning of an arresting ring, therein

DETAILED DESCRIPTION

Figure 2A:
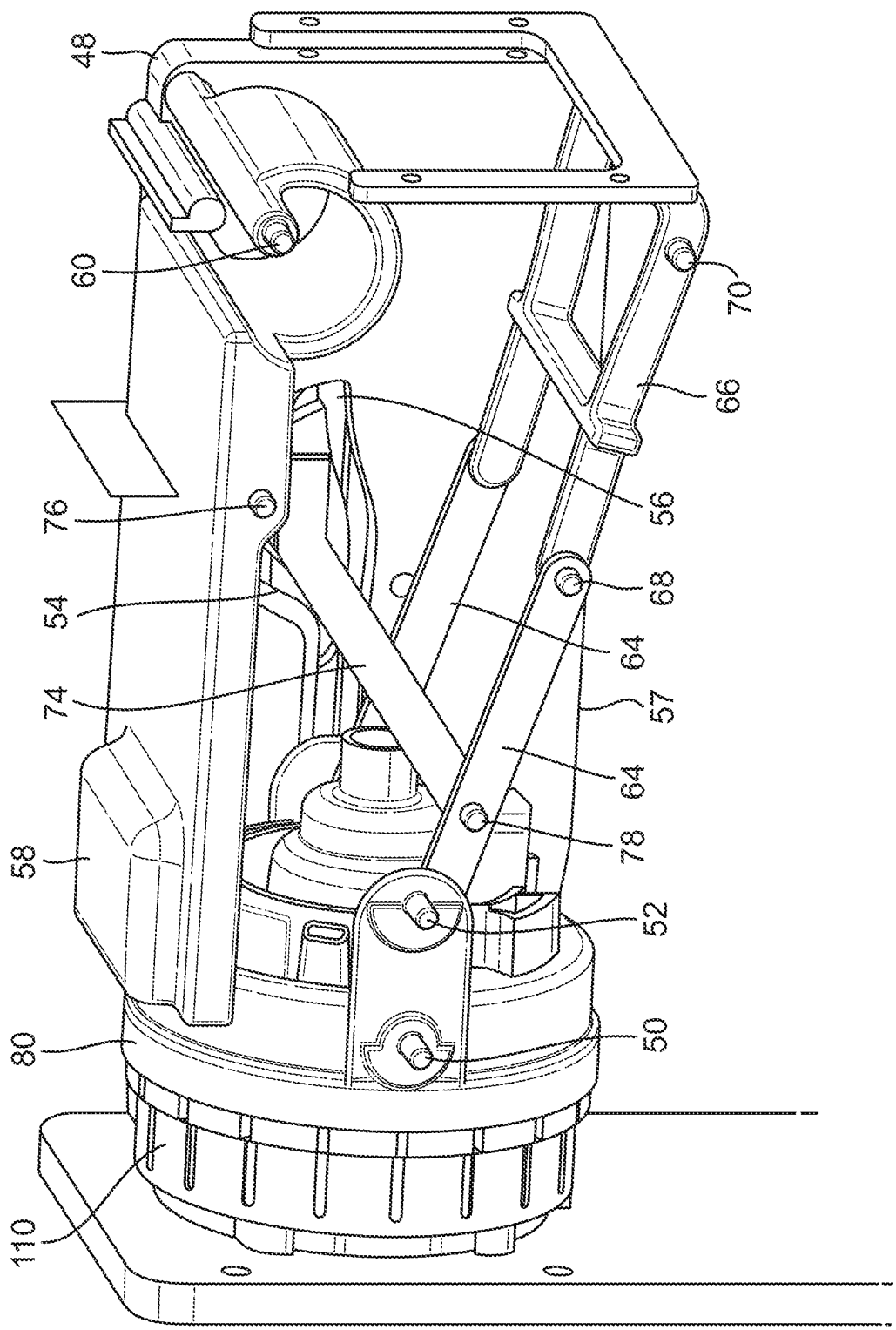
FIGS. 2A, 2B shows respective views of a part of the apparatus of FIGS. 1A, 1B, therein

FIGS. 1A and 1B show schematic cross sectional views of an apparatus 2 for preparing a beverage. The apparatus 2 is configured to cooperate with an exchangeable capsule for example a first exchangeable capsule 4A and a second exchangeable capsule 4B. The apparatus 2 and either one of the exchangeable capsule 4A and 4B form system 1 for preparing a beverage. Hence, the apparatus 2 is configured to cooperate and form a system 1 with the first capsule 4A, but also to cooperate and form a system with the second exchangeable capsule 4B. The apparatus 2 shown in FIGS. 1A and 1B is one and the same apparatus. The apparatus 2 is arranged for selectively cooperating with either the first capsule 4A (see FIG. 1A) or the second capsule 4B (see FIG. 1B). It will be appreciated that the system 1 can include the apparatus 2, the first capsule 4A and the second capsule 4B. Alternatively the apparatus may be configured to form a system with only one type of exchangeable capsule for example the second exchangeable capsule.

The first and second capsules 4A, 4B are of a different type. In this example, the second capsule 4B is larger than the first capsule 4A. An axial length $L_B$ of the second capsule 4B is larger than an axial length $L_A$ of the first capsule 4A.

A diameter $D_B$ of the second capsule 4B is a larger than a diameter $D_A$ of the first capsule 4A. Notwithstanding the differences, in this example the first and second capsules 4A, 4B are designed to make a similar visual impression. The first and second capsules 4A, 4B are designed to have a family look and feel. Here a ratio of the axial length and diameter $L_A/D_A$ of the first capsule 4A is substantially the same as a ratio of the axial length and diameter $L_B/D_B$ of the second capsule 4B. Preferably, the length to diameter ratio of the first and second capsules is identical within 20%, preferably within 10%, e.g. identical.

In view of the similarity, both capsules 4A, 4B will now be described simultaneously. In this example, the capsules 4A, 4B both include a cup-shaped body 6A, 6B. Here the cup-shaped body 6A, 6B includes a bottom 8A 8B and a circumferential wall 10A, 10B. The bottom 8A, 8B and the circumferential wall 10A, 10B can form a monolithic part. The capsules 4A, 4B both include a lid 12A, 12B. The lid 12A, 12B closes off an open end of the cup-shaped body 6A, 6B. The lid 12A, 12B includes an exit area 13A, 13B through which beverage can be drained from the capsule as explained below. In this example the lid 12A, 12B is connected to a flange-like rim 14A, 14B of the capsule 4A, 4B. Here the rim 14A, 14B is an outwardly extending rim. The bottom 8A, 8B, the circumferential wall 10A, 10B and the rim 14A, 14B can form a monolithic part. Here the exit area 13A, 13B defines the area of the lid 12A, 12B through which the beverage can potentially exit the capsule 4A, 4B. Hence, an area of the lid 12A, 12B sealed to the rim 14A, 14B does not constitute part of the exit area 13A, 13B. In this example, the capsules 4A, 4B are substantially rotation symmetric around an axis extending from the bottom 8A, 8B to the lid 12A, 12B. The cup-shaped body 6A, 6B and the lid 12A, 12B enclose an inner space 16A, 16B of the capsule. The inner space 16A, 16B includes a quantity of beverage ingredient, such as an extractable or soluble substance. The beverage ingredient can e.g. be roast and ground coffee, tea, or the like. The beverage ingredient can be powdered coffee. The beverage ingredient can be a liquid. In view of the difference in size of the capsules 4A, 4B it will be appreciated that the second capsule 4B can include a larger quantity of beverage ingredient than the first capsule 4A. In this example, the inner space 16B of the second capsule 4B is about twice the inner space 16A of the first capsule 4A. For example, the first capsule 4A may include 4-8 grams, e.g. about 6 grams, of ground coffee. For example, the second capsule 4B may include 8-16 grams, e.g. about 12 grams, of ground coffee.

The cup-shaped body 6A, 6B can be manufactured from a metal foil, such as aluminium foil, a plastics material, such as polypropylene or polyethylene, or a combination thereof. The cup-shaped body 6A, 6B can be manufactured by pressing, deep-drawing, vacuum forming, injection moulding or the like. The lid can be manufactured from a metal foil, such as aluminium foil, a plastics material, such as polypropylene or polyethylene, or a combination thereof. In the example the capsules 4A, 4B are so-called closed capsules. This indicates capsules that are hermetically closed prior to insertion into the apparatus. The closed capsules can be opened by the apparatus as described below. Alternatively, non-sealed or refillable capsules could also be used. An exchangeable capsule may have different mechanical properties dependent on the material(s) and the thicknesses thereof from which it is manufactured. For example aluminum exchangeable capsules tend to be relatively easily pierced as compared to polymer exchangeable capsules. Polymer exchangeable capsules on the other hand may have a higher flexibility allowing them to be more easily positioned.

The apparatus includes a first brew chamber part 18 and a second brew chamber part 20 that are movable relative to one another. In FIG. 1A and FIG. 1B, the first brew chamber part 18 and the second brew chamber part 20 are shown in a first relative position. In this first relative position the first and second brew chamber parts define an open state allowing the apparatus to be loaded with an exchangeable capsule. In FIG. 1A the first brew chamber part 18 is loaded with a first exchangeable capsule 4A. In FIG. 1B the first brew chamber part 18 is loaded with a second exchangeable capsule 4B. In the embodiment shown the brew chamber parts 18, 20 each are movable relative to the apparatus.

Figure 6A:
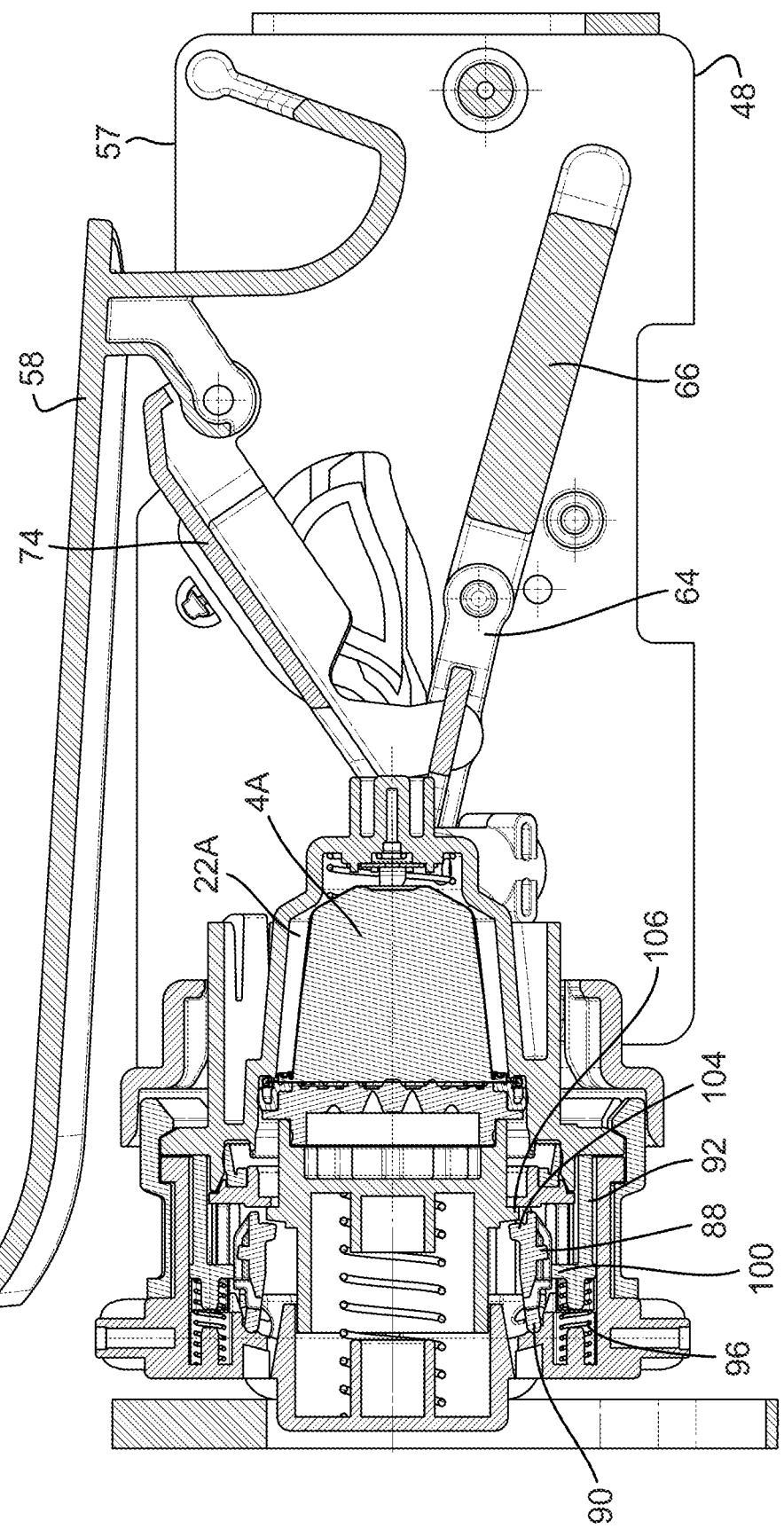
FIG. 6A shows the first exchangeable capsule in the brew chamber during extraction.
Figure 6B:
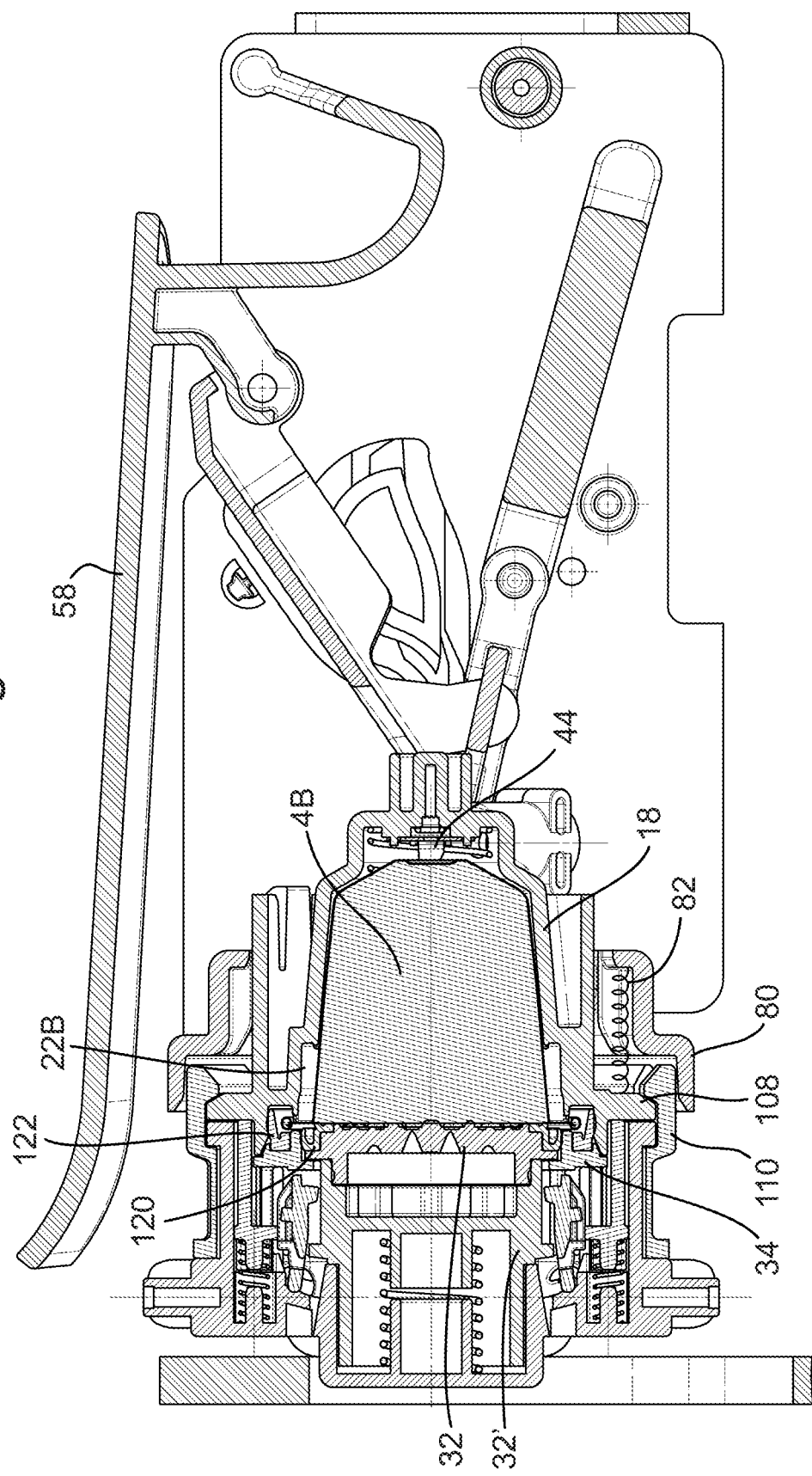
FIG. 6B shows the second exchangeable capsule 4B in the brew chamber during extraction, FIGS. 7A and 7B respectively show an ejection position of the first brew chamber part for the first exchangeable capsule and for the second exchangeable capsule, FIGS. 8A and 8B respectively shows an example of the first exchangeable capsule and the second exchangeable capsule inserted in the brew chamber formed by the first brew chamber part and the second brew chamber part.

The first and second brew chamber parts 18, 20 are movable from the first relative position to the second relative position. In this embodiment the first and second brew chamber parts 18, 20 each assume a respective brewing position in the second relative position, wherein they are closed against each other to form a brew chamber 22A, 22B. By way of example FIG. 6A shows the closed state wherein the first and second brew chamber parts 18, 20 form a brew chamber 22A enclosing the exchangeable capsule 4A. FIG. 6B shows the closed state wherein the first and second brew chamber parts 18, 20 form a brew chamber 22B enclosing the exchangeable capsule 4B.

In this embodiment, the loading position (FIG. 1A, 1B) of the first brew chamber part 18 differs from the brewing position (FIG. 6A, 6B) of the first brew chamber part, in that in its brewing position the first brew chamber part 18 is positioned against the second brew chamber part 20, whereas in the loading position it is positioned at a distance thereof, so that the cavity 24 of the first brew chamber part 18 is accessible for loading an exchangeable capsule. To further facilitate loading, in its loading position the first brew chamber part 18 is rotated with its cavity 24 being accessible from above.

The loading position (FIGS. 1A, 1B) of the second brew chamber part 20 differs from each of the brewing positions (FIGS. 6A, 6B) of the second brew chamber part, in that in a brewing position the second brew chamber part 20 is positioned against the second brew chamber part 20, whereas in the loading position it is positioned at a distance thereof, so that the cavity 24 of the first brew chamber part 18 is accessible for loading an exchangeable capsule.

In the embodiment shown each of the brew chamber parts 18, 20 is movable. I.e. the first brew chamber part 18 is movable in a direction from left to right in the plane of the drawing and is further movable by a rotation in the plane of the drawing. The second brew chamber part 20 is movable in a direction from left to right in the plane of the drawing.

Here the cavity 24 of the first brew chamber part 18 is a predetermined cavity 24 arranged for holding the first or second capsule 4A, 4B. Here the cavity 24 has an invariable shape for holding the first or second capsule 4A, 4B. Here the first brew chamber part 18 is arranged for holding the first or second capsule 4A, 4B without changing a configuration of the first brew chamber part 18. In this example the first brew chamber part 18 is a monolithic part.

The first brew chamber part 18 includes a first biasing member arranged for biasing the capsule 4A, 4B towards the second brew chamber part 20. In the embodiment shown the biasing member is formed by a helical coil 42. Alternatively the biasing member may be provided as a leaf spring or another type of spring. In can also be contemplated to provide the biasing member as a pneumatic biasing element.

A second biasing member is provided that is arranged for biasing the second brew chamber part 20 towards its loading position. In the embodiment shown the second biasing member is formed by a helical spring 84. The helical spring 84 exerts a force on the second brew chamber part 20 that biases it towards the first brew chamber part 18. Other means may be used to provide the biasing force, for example a leaf spring or a pneumatic element.

The apparatus also includes a fluid dispensing device (not shown) for supplying an amount of fluid, such as water, under pressure to the exchangeable capsule, to be enclosed in the brew chamber 22A, 22B. The fluid dispensing device may be coupled to an inlet of the brew chamber, for example inlet 47 of the first brew chamber part 18.

The first brew chamber part 18 includes a cavity 24. The cavity 24 is arranged for receiving an exchangeable capsule. In the embodiment shown the cavity is arranged to receive either one of the first exchangeable capsule 4A and the second exchangeable capsule 4B as the exchangeable capsule. In this example the first brew chamber part 18 includes a first abutment surface 26. The first abutment surface is positioned inside the cavity 24. Here the first abutment surface 26 is a first generally annular abutment surface. The first generally annular abutment surface 26 can be continuously annular, or it may be interrupted annular, such as comprising a plurality of segments along an annulus. The first abutment surface 26 may for example take the shape of one or more, e.g. arched, ridges which protrude into cavity 24. Here the first abutment surface 26 provides the cavity 24 with a stepped shape. In this example the first brew chamber part 18 includes a second abutment surface 28. The second abutment surface is positioned near the open end of the cavity 24. Here the second abutment surface 28 is a second generally annular abutment surface. The second generally annular abutment surface 28 can be continuously annular, or it may be interrupted annular, such as comprising a plurality of segments along an annulus. The second abutment surface 28 may for example take the shape of one or more, e.g. arched, ridges. It will be appreciated that the first abutment surface 26 and the second abutment surface 28 are spaced at a mutual distance in an axial direction of the first brew chamber part 18. The first abutment surface 26 and the second abutment surface 28 are positioned at a fixed spacing. The first abutment surface 26 and the second abutment surface are immobile relative to each other. Here, the first brew chamber part 18 includes an ejector 38. In this example the ejector 38 includes a conical ring 40 arranged at an end of the resilient element 42 facing the capsule. The first brew chamber part 18 includes piercing means 44 for piercing the bottom of the capsule. Here the piercing means includes a plurality of knives, such as three knives. Alternatively or additionally, piercing means may be provided as one or more drilling elements.

As noted above, in an alternative embodiment, the apparatus 2 may be configured to cooperate with a single type of exchangeable capsule for example only the exchangeable capsule 4B. In such alternative embodiment, only one abutment surface, e.g. abutment surface 28 suffices.

The second brew chamber part 20 includes an extraction plate 30. As can best be seen in FIGS. 8A and 8B, in this example, the extraction plate 30 includes a central portion 32 and a peripheral portion 34. The central portion 32 is movable relative to the peripheral portion 34. Here the central portion 32 is movable in an axial direction of the second brew chamber part 20. The extraction plate 30 being provided with a central portion 32 and a peripheral portion 34 that are movable relative to each other further facilitates use of each one of the first exchangeable capsule 4A and the second exchangeable capsule 4B as set out below in more detail. Nevertheless in other embodiments the second brew chamber part 20 of the apparatus may be provided with an extraction plate having only a single part or having mutually fixedly arranged parts.

The system 1 as described thus far can be used for preparing a beverage as follows. Further features of the system 1 will be explained along the way.

In the example of FIGS. 1A and 1B the apparatus 2 is in a state ready for receiving a capsule. In FIGS. 1A and 1B the capsule 4A, 4B has just been inserted into the cavity of the first brew chamber part 18. The first brew chamber part 18 is in an inclined position. The open end of the cavity 24 points upwards.

As shown in FIG. 1A, the first capsule 4A can fall into the cavity 24 under the influence of gravity. Herein the rim 14A of the first capsule 4A is guided by an inner surface 36 of the first brew chamber part 18. The bottom 8A of the first capsule 4A lowers into the cavity 24 until it abuts against the ejector 38. Here the bottom 8A of the first capsule 4A centers on the ejector 38. It will be appreciated that the rim 14A of the first capsule 4A is positioned between the first abutment surface 26 and the second abutment surface 28. The bottom 8A of the first capsule 4A is not yet pierced in this state. A first abutment surface 26 may be absent if the apparatus is only intended for use with the second capsule 4B. Alternatively, a second abutment surface 28 may be absent if the apparatus is only intended for use with the first capsule 4A.

As shown in FIG. 1B, the second capsule 4B can also fall into the cavity 24 under the influence of gravity. Herein the circumferential wall 10B of the second capsule 4B is guided by an inner surface 46 of the first brew chamber part 18. The bottom 8B of the second capsule 4B lowers into the cavity 24 until it abuts against the ejector 38. Here the bottom 8B of the second capsule 4B centers on the ejector 38. It will be appreciated that the rim 14B of the second capsule 4B is positioned beyond the second abutment surface 28 when seen from the piercing means 44. The bottom 8B of the second capsule 4B is not yet pierced in this state.

Once the capsule 4A, 4B is inserted into the cavity 24 as shown in FIGS. 1A and 1B, the first brew chamber part 18 can be moved towards the second brew chamber part 20 for closing the brew chamber around the capsule 4A, 4B. The first brew chamber part 18 is guided in a frame 48 of the apparatus.

Figure 2B:
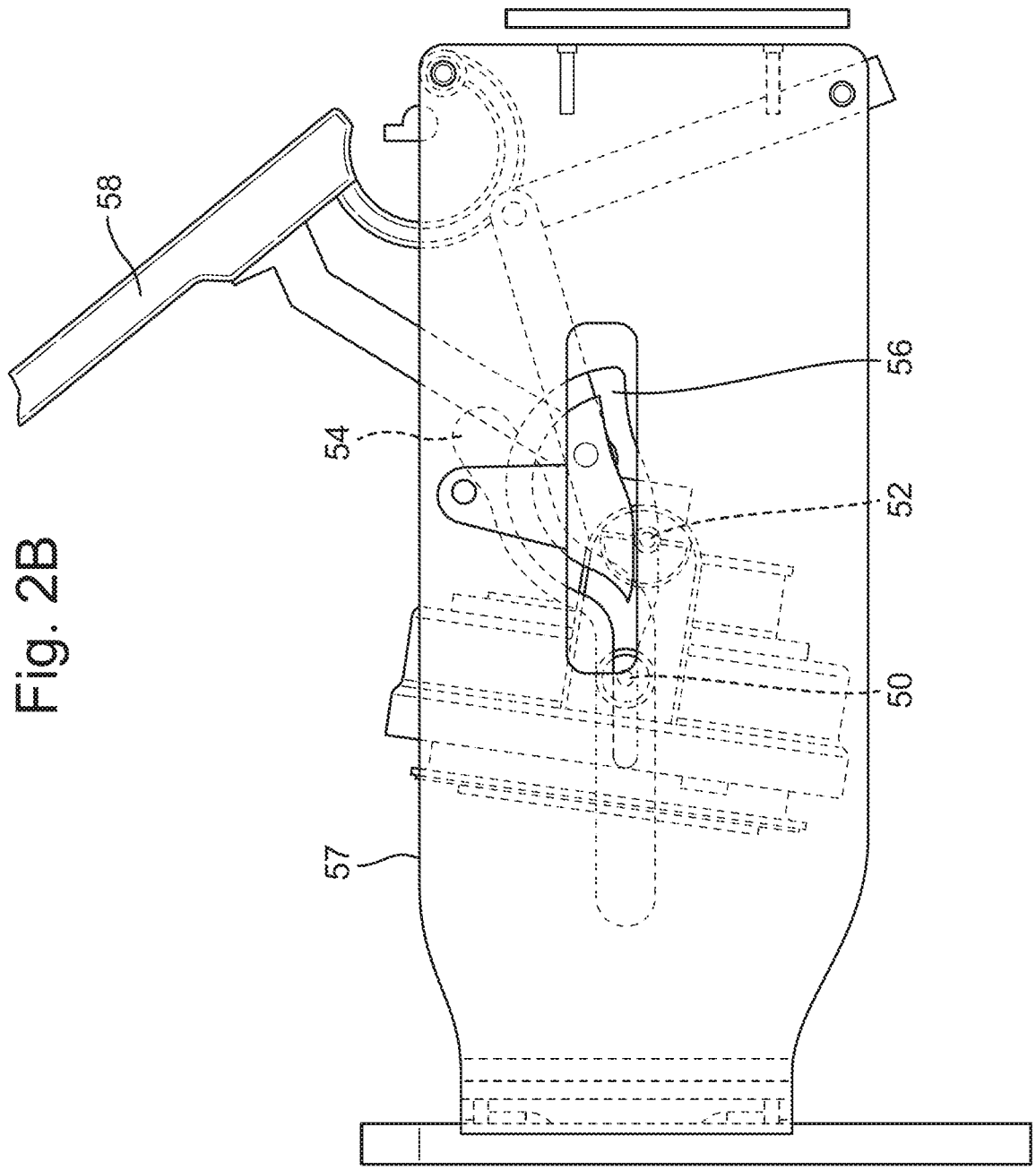

In this example the first brew chamber part 18 includes first bosses 50 and second bosses 52 as shown in FIGS. 2A and 2B. The first bosses 50 are guided in a first groove 54 of the frame 48. The second bosses 52 are guided in a second groove 56 of the frame 48. It will be appreciated that the bosses 50, 52 and grooves 54, 56 determine the path that will be followed by the first brew chamber part 18. Here the first groove 54 and the second groove 56 are provided in a side wall 57 of the frame 48. The first groove 54 extends into the side wall 57 to a first depth. The second groove 56 extends into the side wall to a second depth. The second depth is larger than the first depth. The first boss 50 has a larger diameter than the second boss 52. The first groove 54 has a larger width than the second groove 56. The width of the first groove 54 corresponds to the diameter of the first boss 50. The width of the second groove 56 corresponds to the width of the second boss 52. It will be appreciated that the first groove 54 extends along a different trajectory than the second groove 56. The different widths and depths of the grooves allow the first and second bosses 50, 52 to follow different trajectories. This construction allows a very compact construction for guiding the first and second bosses 50, 52.

The apparatus 2 includes a lever 58. The lever can be actuated manually by a user. The lever is pivotally connected to the frame 48 around a lever axis 60. The first brew chamber part 18 is connected to the frame 48 via a knee joint 62. The knee joint 62 includes a push rod 64 and a crank 66. The push rod 64 is pivotally connected to the crank 66 at a knee axis 68. The crank 66 is pivotally connected to the frame 48 at a crank axis 70. The lever 58 is connected to the knee joint 62 for actuating the first brew chamber part 18 in motion. Here the lever 58 is connected to the knee joint 62 through a lever link 74. The lever link 74 is pivotally connected to the lever 58 at a lever link axis 76. The lever link 74 is pivotally connected to the push rod 74 at a knee link axis 78.

An arresting ring 80 is arranged surrounding the first brew chamber part 18. As can be seen in more detail in FIG. 5A to 5C, the arresting ring 80 is axially movable relative to the first brew chamber part 18. Here, the arresting ring 80 is guided by an external surface of the first brew chamber part 18. The arresting ring is connected to the first brew chamber part via one or more resilient elements 82, here helical springs. The push rod is pivotally connected to the arresting ring 80 at a push rod axis 72. Hence, here the knee joint 62 is indirectly connected to the first brew chamber part 18, viz. via the arresting ring 80 and one or more resilient elements 82. The function of the arresting ring will be set out below.

When the lever 58 is moved in a downward direction the knee joint 62 will push the first brew chamber part 18 towards the second brew chamber part 20. Simultaneously, due to the shape of the first and second grooves 54, 56, the first brew chamber part 18 will be rotated from the upwards inclined orientation into a an aligned orientation in which an axial direction of the first brew chamber part 18 is aligned with an axial direction of the second brew chamber part 20.

As mentioned above, the apparatus 2 is arranged for selectively cooperating with either the first capsule 4A or the second capsule 4B. Here, the system 1 is arranged for automatically adjusting the brew chamber depending on whether the first or the second capsule has been inserted. This provides the advantage that no user input is required for selecting proper handling of the first or second capsule. Hence, the risk of errors is greatly reduced.

As mentioned above, referring in particular to FIGS. 1A, 1B and FIGS. 8A, 8B, the second brew chamber part 20 includes an extraction plate 30 with a central portion 32 and a peripheral portion 34. Here the central portion 32 is movable in an axial direction of the second brew chamber part 20. The central portion 32 in this example includes a shaft 32' axially slidably movable with respect to the frame 48. The central portion 32 is connected to the frame 48 via a biasing member formed as a resilient member 84, here a helical spring. The resilient member 84 biases the central portion into a ready position in FIGS. 1A and 1B. Alternatively or additionally one or more other biasing members may be provided, such as a resilient element that pulls the central portion towards its ready position. The ready position is an extended position in this example. This is the loading position of the second brew chamber part. The central portion 32 can be positioned in a first brewing position for cooperating with the first capsule 4A. The central portion can be positioned in a second brewing position for cooperating with the second capsule 4B. In this example, the system 1 includes a locking mechanism 86 arranged for locking the central portion 32 in or near the first brewing position when the cavity 24 holds the first capsule 4A. The biasing member e.g. resilient member 84 has a lower stiffness than the biasing member (e.g. resilient element 42) that biases the capsule towards the second brew chamber part. Accordingly, in the ready position, the exit area 12A, 12B of the capsule 4A, 4B abuts against the extraction plate 30, but the biasing member that biases the capsule towards the second brew chamber part avoids that the piercing member 44 in this stage pierces the bottom 8A, 8B of the capsule. This may be achieved in that for instance the resilient element 42 keeps the bottom 8A, 8B of the capsule at distance from the piercing member 44, or in that for instance the resilient element 42 assists the capsule in withstanding a force exerted by the piercing member 44. Hence, in that case using the total resilience provided by the resilient element or other biasing element and the resilience of the bottom of the capsule it is achieved that the piercing of the capsule is postponed until after the system of apparatus and capsule has achieved its ready position. To provide for a reproducible operation the combined resilience of the least resilient capsule and the separate resilient element or other element of the apparatus exerting a biasing force should exceed the resilience of the biasing member that biases the second brew chamber part 20 into its ready position.

Upon a further displacement towards the brewing position, the extraction plate 30 or central portion 32 is locked, effectively ending the dynamical range of the second basing member, e.g. resilient element 84. From that point onward the first biasing member, e.g. the resilient element 42 or other biasing means, possibly in combination with the resilience of the capsule can no longer withstand the force exerted by the extraction plate 30 or part thereof on the exit area 12A, 12B of the capsule. As a result the bottom 8A, 8B of the capsule is pierced by the piercing member 44, so that the fluid dispensing device can supply an amount of fluid, such as water, under pressure to the exchangeable capsule.

It is noted that it is not necessary that a separate element is provided for defining an end of the dynamical range of the second biasing member. The second biasing member, e.g. resilient element 84 may have an intrinsic end of its dynamical range that complies with the dynamical range required for operation of the apparatus. For example the resilient element 84 may be in a fully compressed state in the ready position shown in FIG. 3A or FIG. 4A, so that a further progression of the body 94 towards the first brew chamber part 18 causes the first biasing member, e.g. resilient element 42 to yield, allowing the bottom 8A, 8B of the capsule to be pierced.

It is noted that in embodiments intended for use with a single type of exchangeable capsule only, it suffices if the second brew chamber part only has a single brew position in addition to its loading position/ready position. As indicated above, it suffices if the extraction plate 30 has only one portion or portions that are fixedly arranged with respect to each other. Also in such embodiments for use with only a single type of capsule a locking mechanism is superfluous. An example of a locking mechanism for facilitating cooperation of the apparatus 2 with different types of exchangeable capsules is described below with reference to FIGS. 3A, 3B and FIGS. 4A, 4B.

Therein, the locking mechanism 86 includes a locker 88. Here the locker 88 is designed as a pivotable finger, pivotable around a pivoting axis 90. The locker 88 is biased into a position pivoted away from the shaft 32'. The locker could also be biased into any other suitable position. The locking mechanism 86 further includes a pusher 92. The pusher is slidably guided in a body 94 of the second brew part 20. The pusher 92 is connected to the body 94 via a resilient member 96, here a helical spring. The resilient member 96 biases the pusher in an extended position. The first brew chamber part 18 includes an actuator 98. Here the actuator is formed by a frontal surface of the first brew chamber part 18.

Figure 3A:
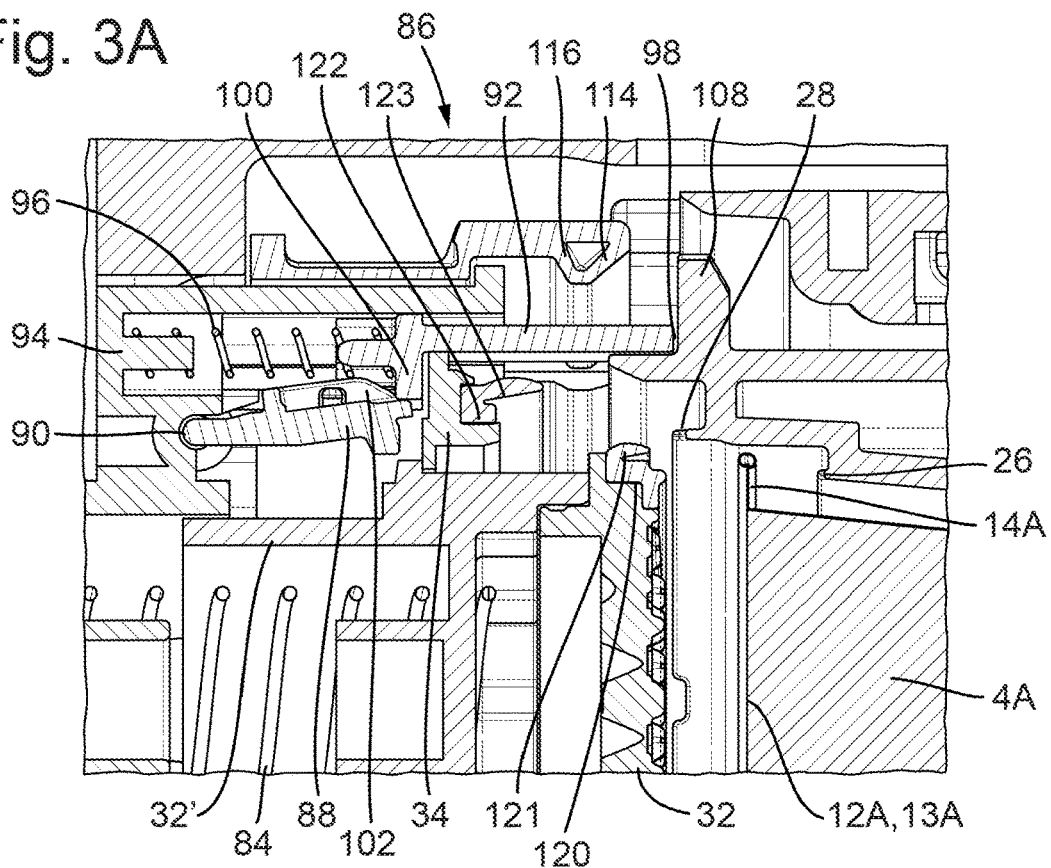
FIGS. 3A and 3B show functioning of a locking mechanism of the apparatus when cooperating with the first exchangeable capsule, therein
Figure 3B:
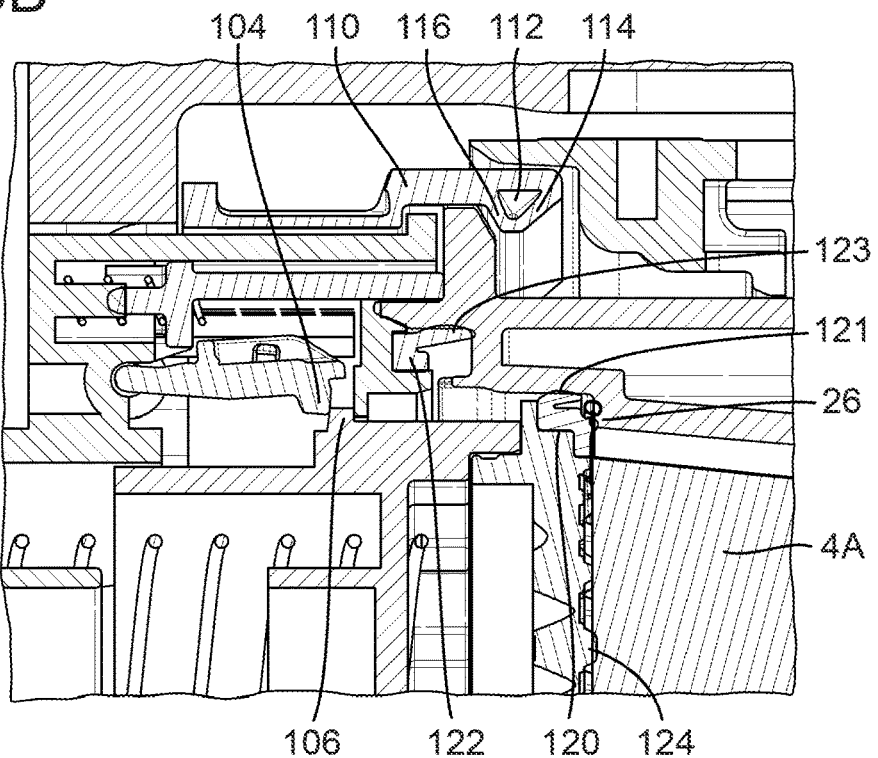

FIGS. 3A and 3B show functioning of the locking mechanism 86 when the cavity 24 holds the first capsule 4A. In this example, an outermost part of the first capsule 4A, here formed by the lid 12A, exit area 13A and/or rim 14A, is positioned rearwardly, i.e. more towards the piercing means 44, relative to the actuator 98. As a result, when advancing the first capsule 4A towards the second brew chamber part 20, the actuator 98 will touch the pusher 92 before the outermost part of the first capsule 4A will touch the central portion 32. The pusher is pushed against the biasing force of the resilient member 96. A lip 100 of the pusher 92 will slide along a sloping surface 102 of the locker 88, causing the locker 88 to pivot towards the shaft 32'. As a result, a thumb 104 of the locker 88 is placed in a path of movement of part 106 of the central portion 32 (see FIG. 3B). When the first capsule 4A is advanced further towards the second brew chamber part 20 the first capsule 4A will abut against the central portion 32. (FIG. 3A) This can cause the central portion to be pushed against the biasing force of the resilient member 84. The pivoted locker 88 prevents travel of the central portion beyond a position where the part 106 abuts against the thumb 104. This is herein defined as the first brewing position. Hence, the first capsule 4A is arranged for moving the central portion 32 from the ready position (FIG. 3A) to the first brewing position (FIG. 3B). The first capsule 4A is held between the first and second brew chamber parts 18, 20 while brewing, wherein the central portion 32 is in the first brewing position.

Figure 4A:
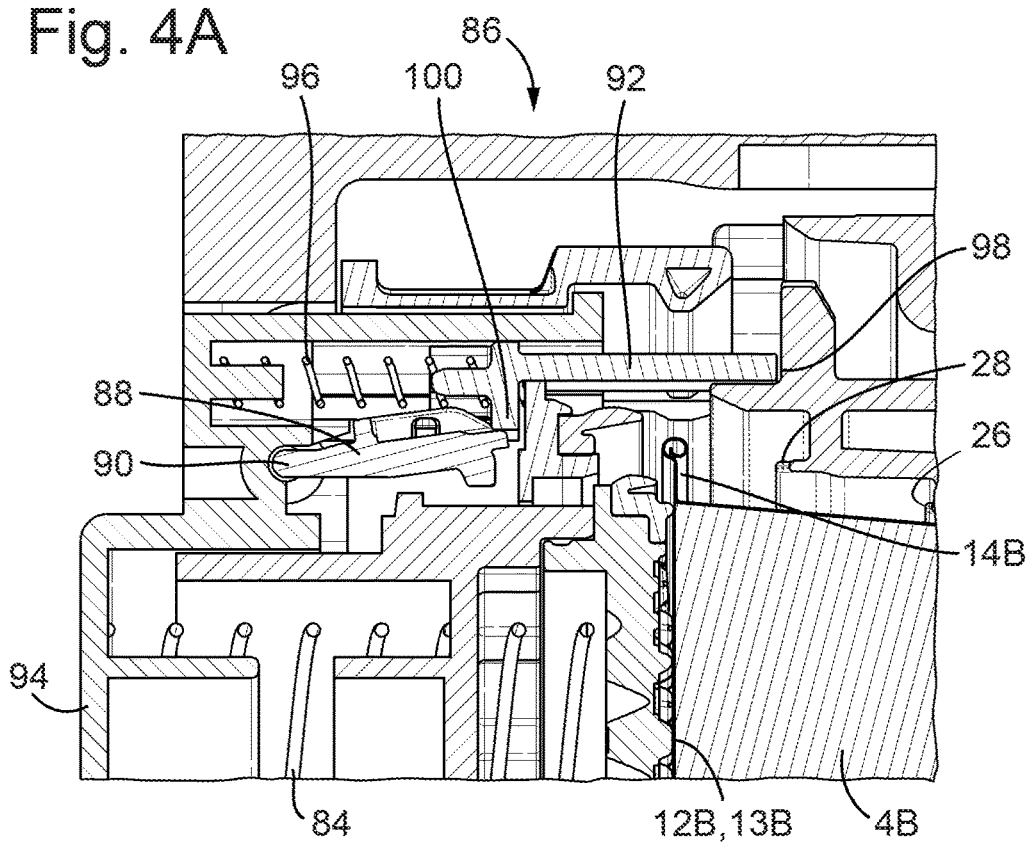
FIGS. 4A and 4B show functioning of the locking mechanism of the apparatus when cooperating with the second exchangeable capsule, therein
Figure 4B:
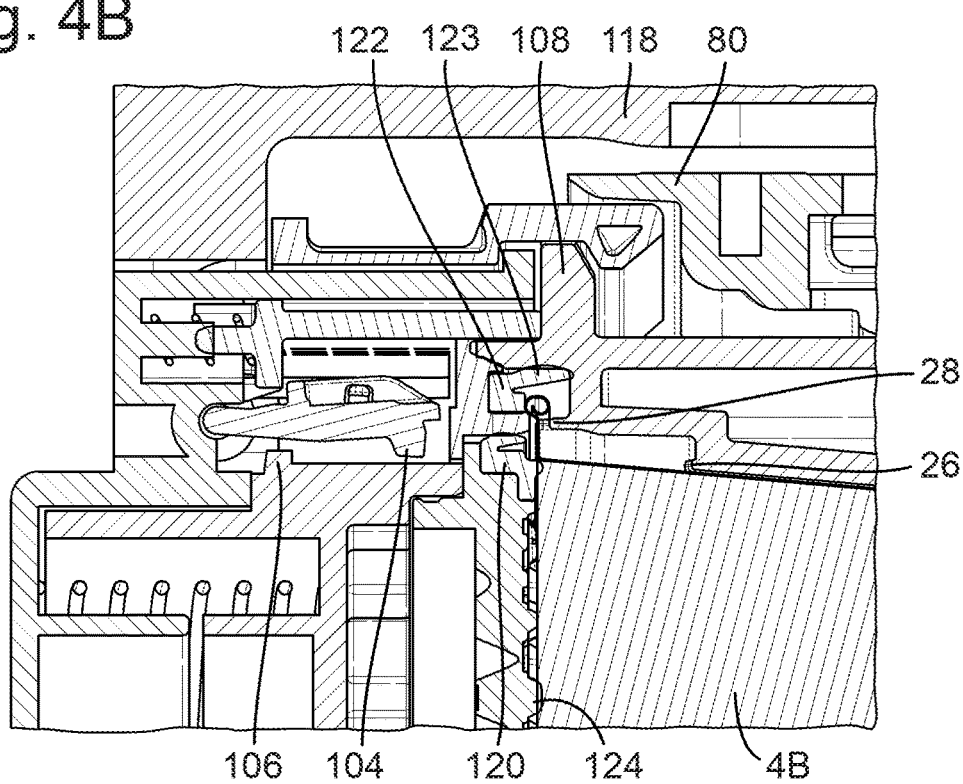

FIGS. 4A and 4B show functioning of the locking mechanism 86 when the cavity 24 holds the second capsule 4B. In this example, an outermost part of the second capsule 4B, here formed by the lid 12B, exit area 13B and/or rim 14B, is positioned forwardly, i.e. more towards the second brew chamber part 20, relative to the actuator 98. As a result, when advancing the second capsule 4B towards the second brew chamber part 20, the outermost part of the second capsule 4B will abut against the central portion 32 before the actuator 98 will touch the pusher 92. The central portion 32 is pushed against the biasing force of the resilient member 84 while the locker 88 is still pivoted away from the shaft 32'. As a result, the part 106 passed underneath the thumb 104. Only after the part 106 has passed the thumb 104 the pusher is pushed against the biasing force of the resilient member 96 by the actuator 98. The lip 100 of the pusher 92 will still slide along the sloping surface 102 of the locker 88, causing the locker 88 to pivot towards the shaft 32'. However, the part 106 has already passed the thumb 104 at that moment. In this example, the second capsule 4B pushes the central portion 32 in abutment with the body 94. This is herein defined as the second brewing position. Hence, the second capsule 4B is arranged for moving the central portion 32 from the ready position to the second brewing position. The second capsule 4B is held between the first and second brew chamber parts 18, 20 while brewing, wherein the central portion 32 is in the second brewing position.

Thus, the locking mechanism 86 is arranged for locking the central portion 32 in the first extraction position when the cavity 24 holds the first capsule 4A. It is noted that the locking may be single-sided, viz. the locking mechanism may prevent the central portion 32 from being moved beyond the first extraction position when the cavity 24 holds the first capsule 4A. However movement of the central portion 32 from the first extraction position to the ready position may be not prevented. The locking unit 86 is arranged for selectively preventing the central portion 32 being locked in or near the first brewing position when the second capsule 4B is included in the brew chamber. The locking unit 86 is arranged for selectively allowing the central portion 32 being moved into the second brewing position when the second capsule is included in the brew chamber.

When comparing FIGS. 3A and 4A it will be appreciated that while advancing the first brew chamber part 18 towards the second brew chamber part 20 the first capsule 4A is recessed further into the first brew chamber part than the second capsule 4B. Then the first lid 12A, exit area 13A and/or rim 14B is recessed further into the first brew chamber part 18 than the second lid 12B, exit area 13B and/or rim 14B.

When comparing FIGS. 3B and 4B it will be appreciated that when the brew chamber holds the first capsule 4A, the central portion 32 extends into the cavity 24. The central portion 32 extends into the first brew chamber part 18 beyond a position where the lid 12B, exit area 13B and/or rim 14B of the second capsule 4B would have been, had the second capsule been included in the first brew chamber part 18.

Figure 5A:
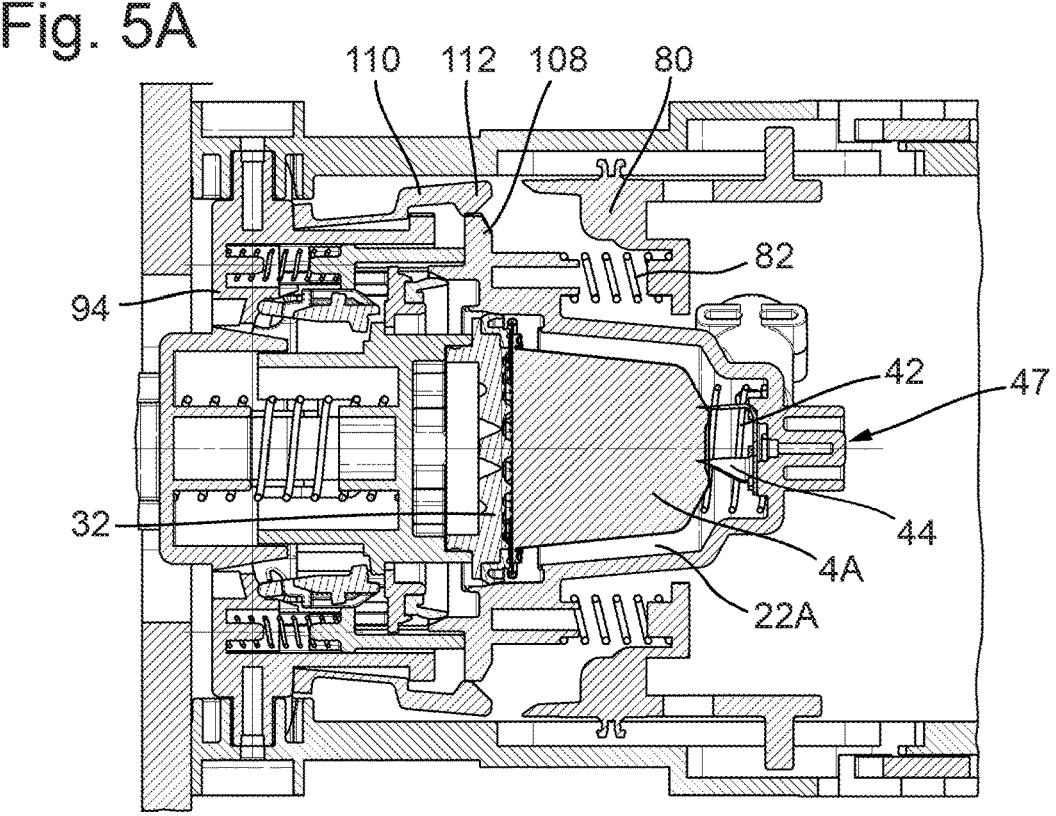
FIG. 5A shows the arresting ring for the ready position associated with the first exchangeable capsule.
Figure 5B:
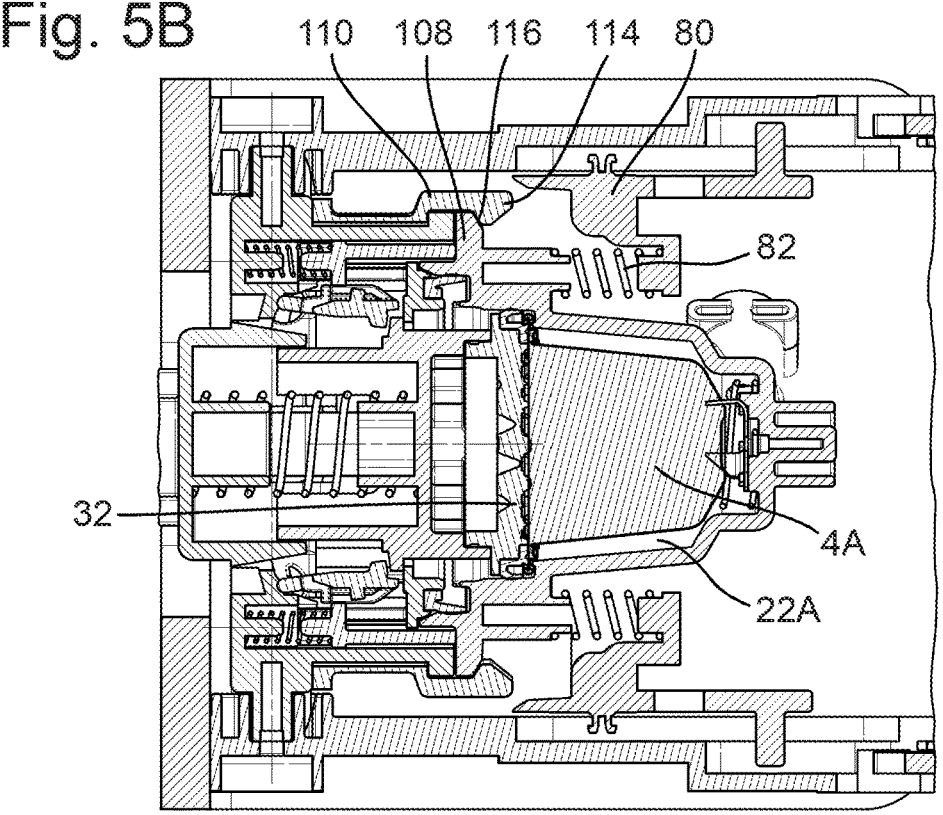
FIG. 5B shows the arresting ring for a position intermediate the ready position and the brewing position associated with the first exchangeable capsule.
Figure 5C:
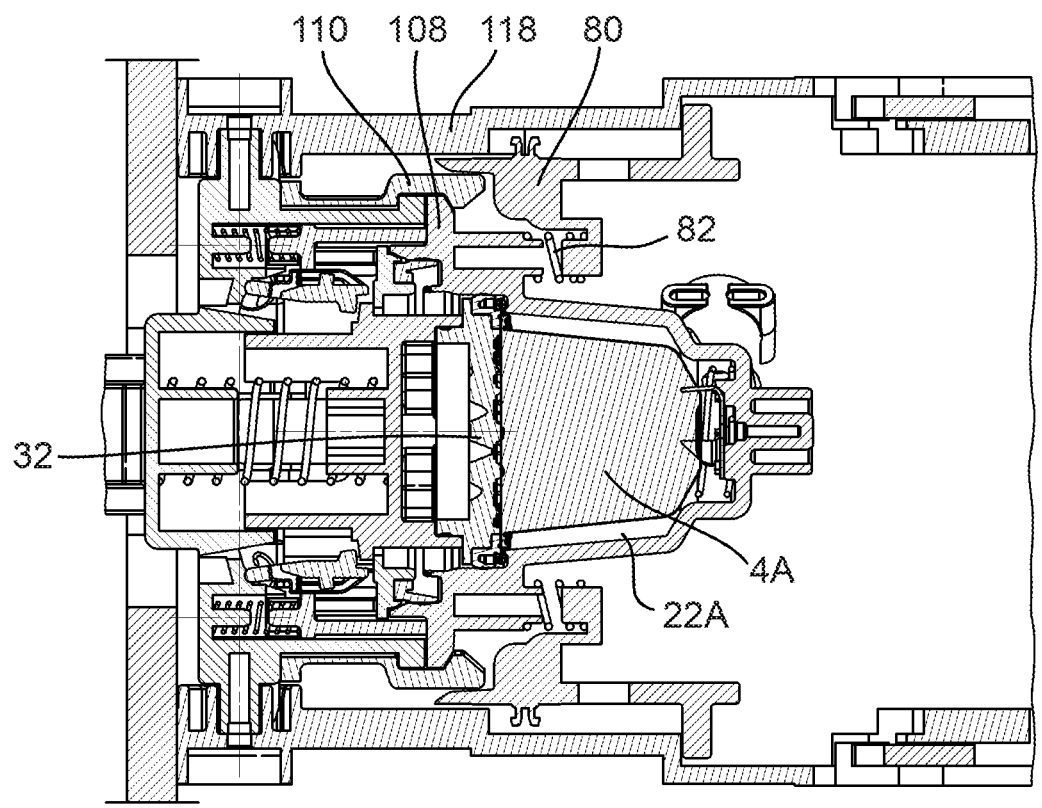
FIG. 5C shows the arresting ring for the brewing position associated with the first exchangeable capsule.

As mentioned above, the knee joint 62 is indirectly connected to the first brew chamber part 18, viz. via the arresting ring 80 and one or more resilient elements 82. FIGS. 5A-5C demonstrate functioning of the arresting ring 80.

In FIG. 5A the first capsule 4A abuts against the central portion 32 with the central portion in its first brewing position. The first brew chamber part 18 is in a position intermediate its loading position and its brewing position. The first biasing member 42 of the first brew chamber part biases the capsule 4A towards the second brew chamber part 32, therewith avoiding that the piercing member 44 pierces the bottom 8A of the capsule 4A in this stage.

The arresting ring 80 is still in the rearward position. It will be appreciated that the lever 58 will not yet have reached its end position. The first brew chamber part 18 includes a protrusion 108. Here the protrusion 108 is a substantially annular protrusion. The protrusion 108 extends outwardly. Here the protrusion 108 forms an outermost edge of the first brew chamber part 18. The second brew chamber part 20 includes a retainer 110. Here the retainer 110 is designed as a circumferential ring of retainer lips. The retainer 110 is pivotally connected to the body 94. Here the retainer 110 is resiliently pivotally connected to the body 94. The retainer 110 includes a tooth 112. The tooth here has a first inclined surface 114 and a second inclined surface 116.

When lowering the lever 58, the arresting ring 80 will be advanced towards the second brew chamber part 20. The one or more resilient elements 82 will push the first brew chamber part 18 ahead of the arresting ring 80 until the first brew chamber part reaches its brewing position wherein it abuts against the second brew chamber 20 part, e.g. with the capsule 4A, 4B clamped in between. This causes the retainer 110 to be pivoted outwardly (see FIG. 5A). During this movement of the first brew chamber part 18, the protrusion 108 will advance against the first inclined surface 114.

In this stage the force exerted by the second brew chamber part 20 exceeds the biasing force exerted by the resilient member 42. Consequently, the piercing means 44 are forced into the bottom 8A of the capsule 4A therewith providing an access for supplying an amount of fluid, such as water, under pressure to the exchangeable capsule, At the same time the capsule 4A is forced into the cavity Further advancing causes the protrusion 108 to pass beyond the second inclined surface 116, causing the retainer 110 to pivot inwardly (see FIG. 5B). Upon further lowering of the lever 58 first brew chamber part abuts against the second brew chamber 20 part, which will cause the one or more resilient elements 82 to be compressed. As a result, the arresting ring 80 will advance towards the second brew chamber part 20. Fully lowering the lever 58 will cause the arresting ring 80 to be interposed between the retainer 110 and a locking ring 118 (see FIG. 5C). The arresting ring 80 surrounding the retainer 110 prevents the retainer 110 from pivoting outwardly. Hence, the first brew chamber part is locked with respect to the second brew chamber part 20. The first brew chamber part is locked onto the second brew chamber part 20.

The apparatus can include a fluid supply system for supplying a fluid, e.g. a liquid, such as hot water under pressure, to the first brew chamber part 18. When the brew chamber is pressurized with the fluid for brewing a beverage, the first and second brew chamber parts 18, 20 will be pushed away from each other by the fluid pressure. The retainer 110 and arresting ring 80, and optionally the locking ring 118, will bear all, or part of, the force exerted by the fluid pressure. The arresting ring 80 interposed between the retainer 110 and the locking ring 118 increases mechanical stability. The arresting ring 80 does not have to bear all forces exerted onto it by the retainer 110, since it can abut against the locking ring 118 and transmit at least part of the forces to the locking ring 118. The locking ring 118 can be immobile, and hence can easily be reinforced. Since the first brew chamber part is locked onto the second brew chamber part 20 the frame 48 and the actuation mechanism, e.g. the knee joint, do not have to bear this force, or at least a smaller part thereof. Hence the frame and/or the actuation mechanism can be designed weaker and/or cheaper.

Although the functioning of the arresting ring 80 has been shown in FIGS. 5A-5C with respect to the first capsule 4A, it will be appreciated that the arresting ring 80 can function identically with respect to the second capsule 4B. FIG. 6A shows the first capsule 4A in the brew chamber during extraction. FIG. 6B shows the second capsule 4B in the brew chamber during extraction.

The piercing member 44 is arranged for piercing the bottom 8A, 8B of the capsule 4A, 4B. As can also be seen in FIGS. 5A-5C, in this example the piercing member 44 does not pierce the bottom 8A, 8B until the lid 12A, 12B of the capsule 4A, 4B abuts against the central portion 32 in the first or second brewing position. Thereto, stiffnesses of the resilient element 42 and the resilient member 84 can be chosen. In this example, the stiffness of the resilient element 42 is chosen to be larger than the stiffness of the resilient member 84.

Once the capsule 4A, 4B is included in the brew chamber, and the bottom 8A, 8B has been pierced, a fluid, in this example hot water under pressure, can be supplied to the brew chamber. Therefore it is desired that the brew chamber is leak tight. Thereto the central portion 32 is provided with a first sealing member 120. The peripheral portion 34 is provided with a second sealing member 122. The beverage preparation apparatus 2 is arranged for preparing a quantity of a beverage, suitable for consumption, using either a first capsule 4A or a second capsule 4B. The quantity can be a predetermined quantity. The quantity can also be a user selectable, user settable, or user programmable quantity.

Referring to FIG. 3B sealing in view of the first capsule 4A is described. The first sealing member 120 is arranged for providing a fluid sealing engagement between the central portion 32 and the first brew chamber 18 part when forming the brew chamber for holding the first capsule 4A. In this example, the first sealing member 120 abuts against the first brew chamber part 18 when the first capsule 4A is included in the brew chamber. This provides a seal for water being present in the cavity 24 outside the capsule 4A. This way, brewing fluid injected into the brew chamber 22A is prevented from bypassing around the outside of the capsule 4A. In the example of FIG. 3B the first sealing member 120 includes a resilient lip 121. The resilient lip 121 is arranged to provide a self-reinforcing sealing engagement between the central portion 32 and the first brew chamber part 18 under the effect of fluid pressure in the brew chamber. In this example the first sealing member 120 abuts against the rim 14A of the first capsule 4A. The rim 14A is pressed against the first sealing member 120 by the first abutment surface 26. This provides a sealing engagement between the central portion 32 and the capsule 4A against beverage exiting the capsule 4A via the exit area 13A. It will be appreciated that here the side of the rim 14A facing away from the cup-shaped body 6A is sealed against the second brew chamber part 20. Alternatively, or additionally, the side of the rim 14A facing towards the cup-shaped body 6A can be sealed against the first brew chamber part 18. Thereto an additional seal can be provided on the first brew chamber part 18, e.g. on the first abutment surface 26, and/or on the capsule 4A, e.g. on the rim 14A. It will be clear that a seal on the capsule may be additional to the seal between the first brew chamber part 18 and the second brew chamber part 20. This may reduce the sealing effort by the first sealing member 120.

Referring to FIG. 4B sealing in view of the second capsule 4B is described. The second sealing member 122 is arranged for providing a fluid sealing engagement between the peripheral portion 34 and the first brew chamber 18 part when forming the brew chamber for holding the second capsule 4B. In this example, the second sealing member 122 abuts against the first brew chamber part 18 when the second capsule 4B is included in the brew chamber. This provides a seal for water being present in the cavity 24 outside the capsule 4B. In the example of FIG. 4B the second sealing member 122 includes a resilient lip 123. The resilient lip 123 is arranged to provide a self-reinforcing sealing engagement between the peripheral portion 34 and the first brew chamber part 18 under the effect of fluid pressure in the brew chamber. In this example the second sealing member 122 abuts against the rim 14B of the second capsule 4B. The rim 14B is pressed against the second sealing member 122 by the second abutment surface 28. This may provide a sealing engagement between the peripheral portion 34 and the capsule 4B against beverage exiting the capsule 4B via the exit area 13B. In FIG. 4B the first sealing member 120 provides a sealing engagement between the central portion 32 and the peripheral portion 34 when forming the brew chamber for holding the second capsule 4B. This sealing engagement between the central portion 32 and the peripheral portion 34 can be self-reinforcing. Thereto the engagement between peripheral portion 34 and the second capsule 4B may allow brewing fluid to pass to the first sealing member 120. Hence, the first sealing member 120 provides a sealing engagement between the central portion 32 and the capsule 4B against beverage exiting the capsule 4B via the exit area 13B. It will be appreciated that here the side of the rim 14B facing away from the cup-shaped body 6B, which rim may or may not be covered by a lid, for example by a foil, may be sealed against the second brew chamber part 20. Alternatively, or additionally, the side of the rim 14B facing towards the cup-shaped body 6B can be sealed against the first brew chamber part 18. Thereto an additional seal can be provided on the first brew chamber part 18, e.g. on the second abutment surface 28, and/or on the capsule 4B, e.g. on the rim 14B. It will be clear that a seal on the capsule may be additional to the seal between the first brew chamber part 18 and the second brew chamber part 20. This may reduce the sealing effort by the second sealing member 122.

When the fluid under pressure is supplied to the capsule 4A, 4B in the brew chamber, the exit area 13A, 13B may open against the extraction plate 30. The extraction plate 30 in this example includes a plurality of relief elements 124. Here the relief elements 124 are truncated pyramids. A rise in pressure inside the capsule 4A, 4B can cause the exit area 13A, 13B to tear against the relief elements allowing beverage to exit the capsule 4A, 4B.

The beverage can pass through the extraction plate 30 via apertures in the extraction plate. Next the beverage can flow to an outlet 126. From the outlet 126 the beverage can flow into a receptacle, such as a cup.

In the previous sections aspects are disclosed that facilitate operation of the apparatus 2 with any of a first exchangeable capsule 4A and a second exchangeable capsule 4B. Other embodiments are conceivable, wherein the apparatus 2 is particularly suited for operating with a first exchangeable capsule 4A or particularly suited for operating with a second exchangeable capsule 4B.

In an apparatus 2 that is particularly suited for operating with a first exchangeable capsule 4A it may be considered to exclude one or more of the following elements: the second abutment surface 28, the peripheral portion 34 of the extraction plate 30, the locker 88, the pusher 92, the resilient element 96, the actuator 98.

In an apparatus 2 that is particularly suited for operating with a second exchangeable capsule 4B it may be considered to exclude one or more of the following elements: the first abutment surface 26, the locker 88, the pusher 92, the resilient element 96, the actuator 98. The extraction plate 30 may be provided as a single part, or as a mutually rigidly coupled central portion and peripheral portion.

Once the beverage has been brewed, the lever 58 can be moved upwardly. This causes the arresting ring 80 to be moved away from the retainer 110. Next, the first brew chamber part 18 will be moved rearwardly. The second inclined surface 116 of the retainer 110 can allow the retainer to pass the projection 108. The first brew chamber 18 part will move away from the second brew chamber part 20. The central portion 32 will return to the ready position. The bosses 50, 52 and grooves 54, 56 determine the path that will be followed by the first brew chamber part 18. As shown in FIGS. 7A and 7B the first brew chamber part will swivel downwardly. This promotes ejection of the used capsule 4A, 4B from the cavity 24 under the effect of gravity. The ejector 38 can assist in pushing the capsule 4A, 4B off the piercing member 44 and out of the cavity 24. The used capsule 4A, 4B can fall into a waste basket of the apparatus 2.

Figure 8A:
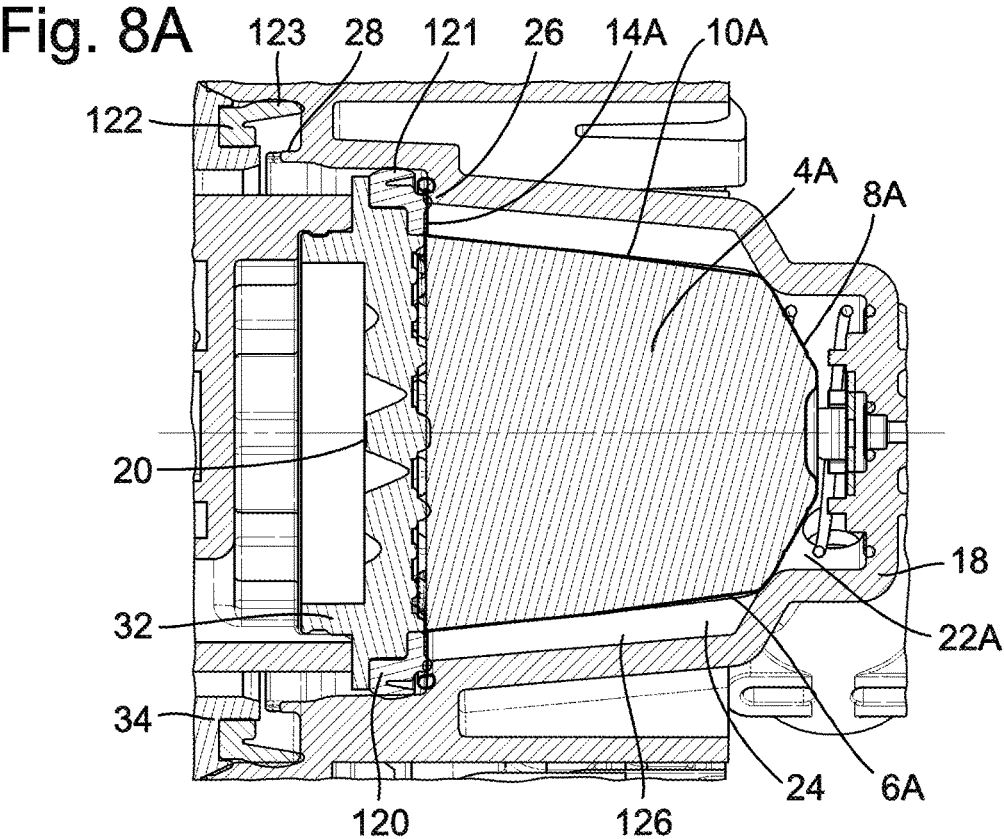
Figure 8B:
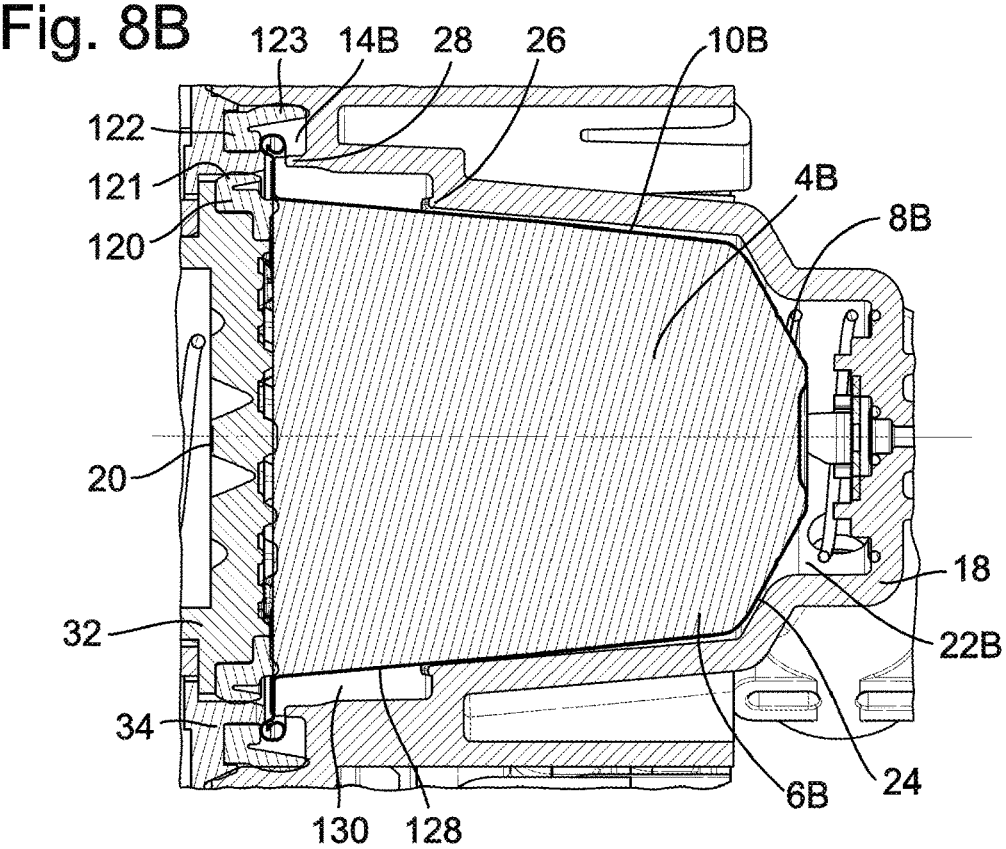

In this example the first and second capsules 4A, 4B are designed to make a similar visual impression. FIG. 8A shows an example of a first capsule 4A inserted in the brew chamber 22A formed by the first brew chamber part 18 and the second brew chamber part 20. It will be appreciated that the circumferential wall 10A is narrower than the cavity 24 at that location. As a result there is a first volume 126 surrounding the first capsule 4A inside the cavity 24. FIG. 8B shows an example of a second capsule 4B inserted in the brew chamber 22B formed by the first brew chamber part 18 and the second brew chamber part 20. It will be appreciated that a part 128 of the circumferential wall 10B is narrower than the cavity 24 at that location. This part 128 is formed by the part of the circumferential wall 10B extending beyond the first abutment surface 26. As a result there is a second volume 130 surrounding the second capsule 4B inside the cavity 24.

It is noted that the first volume 126 is not occupied by the first capsule 4A when the brew chamber holds the first capsule 4A. However, this first volume 126 is occupied by part of the second capsule 4B when the brew chamber holds the second capsule 4B. The second volume 130 is not occupied by the second capsule 4B when the brew chamber holds the second capsule 4B. This second volume 130 receiving the central portion 32 of the extraction plate 30 when the brew chamber holds the first capsule 4A.

When brewing a beverage using the first capsule 4A, the first volume 126 will fill with fluid, such as water, which fluid is not used for brewing the beverage. This fluid can be drained to the waste basket after brewing. When brewing a beverage using the second capsule 4B, the second volume 130 will fill with fluid, such as water, which fluid is not used for brewing the beverage. This fluid can be drained to a container, e.g. the waste basket, after brewing. In this example the first volume 126 is substantially equal to the second volume 130. Hence, the volume of fluid directed to the waste basket is substantially equal when brewing a beverage using a first capsule 4A and when brewing a beverage using a second capsule 4B.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

In the examples, the central portion of the extraction plate includes a plurality of relief elements. The peripheral portion includes no relief elements. However, it will be appreciated that the peripheral portion may also include relief elements. The extraction plate and the second exit area can be adapted to each other such that a flow resistance of the second exit area when opened is less than a flow resistance of the first exit area when opened. The extraction plate and the second exit area may be adapted to each other such that the second exit area tears on the extraction plate over a larger surface area than the first exit area. The extraction plate and the second exit area may be adapted to each other such that the second exit area tears on the extraction plate om more locations than the first exit area. Outer relief elements may be designed for tearing both the first and second exit area wherein the second exit area tears on the outer relief elements over a larger surface area than the first exit area. The extraction plate can include relief elements of a first type and at least one relief element of a second type, wherein the relief elements of the first type are arranged within an area corresponding to the first exit area, and the at least one relief element of the second type being arranged within an area corresponding to the second exit area and outside the area corresponding to the first exit area. The relief element of the second type may have a sharper edge than the relief elements of the first type. The second exit area may include a weakened zone. The weakened zone may be located in a peripheral area of the second exit area.

In the examples, the first and second capsules have substantially the same shape. It is also possible to provide a third capsule having a different shape. The third capsule can e.g. be shaped to substantially fill the brew chamber when the central portion is in the first extraction position. It is also possible to provide a fourth capsule having a different shape. The fourth capsule can e.g. be shaped to substantially fill the brew chamber when the central portion is in the second extraction position.

In the examples, the first capsule has an outwardly extending flange-like rim. It will be appreciated that it is possible that the first capsule does not include an outwardly extending rim. In the examples, the second capsule has an outwardly extending flange-like rim. It will be appreciated that it is possible that the second capsule does not include an outwardly extending rim.

In the examples, the capsule body and lid are made of aluminium foil, preferable polymer coated aluminium foil to allow easy welding of the lid to the body. It will be appreciated that the capsule body and/or lid can be made of a wide variety of materials considered suitable by the skilled person and capable of being processed into a sheet, film or foil using techniques conventionally known in the art such as extrusion, co-extrusion, injection molding, blow molding, vacuum forming etc. Suitable materials for the capsule body and/or lid include, without being limited thereto, plastic materials, in particular thermoplastic materials, for example a polyolefin polymer, for example polyethylene or polypropylene, PVC, polyesters for example polyethylene terephthalate (PET); metal foils such as aluminum, stainless steel, metal alloys etc.; or sheets of a woven or a non-woven or otherwise processed fibrous material, like paper, polyester, etc.; or combinations thereof, e.g. multilayers. The material for the capsule can be a biodegradable polymer or another biodegradable material. The skilled person will be capable of selecting the appropriate material taking into account the envisaged use with food material and any other relevant circumstances during use of the capsule. The thickness of the sheet or foil may be chosen such that a form stable capsule is provided. The thickness of the sheet or foil may vary with the nature of the material.

In the examples, the capsules are closed capsules. It is also possible to provide the system with an open capsule. The open capsule is open prior to insertion into the apparatus. The open capsule can be pre-perforated. The open capsule can be packaged in a hermetically sealed package which has to be removed before inserting the open capsule in the apparatus. In the examples, the capsules are pierced by the piercing means. It is also possible to provide the system with a capsule that is not pierced by the piercing means. Such capsule can e.g. include an entrance filter. In the examples, the capsules open against the extraction plate. It is also possible to provide the system with a capsule that does not open against the extraction plate. Such capsule can e.g. include an exit filter.

In the examples, the capsules themselves do not include a sealing member. It will be appreciated that it is possible to provide the capsule with a sealing member, e.g. a resilient sealing member. The sealing member can e.g. be placed on the rim, e.g. on the side facing towards the cup-shaped body or on the side facing away from the cup-shaped body. Alternatively, or additionally, a sealing member can be provided on the circumferential wall and/or on the bottom.

In the examples the arresting ring and retainer extend along substantially the entire perimeter of the first and second brew chamber parts. This provides particular good locking of the two brew chamber parts onto each other. However, it will be appreciated that it is also possible that the arresting ring and retainer include arresting means and retaining means at one or more discrete positions along the perimeter, e.g. at two, three, four, six or eight positions.

It will be appreciated that it is also possible to provide a first apparatus arranged for brewing a beverage using a first capsule, but incapable of brewing a beverage using a second capsule. Such first apparatus can be included in a system with the apparatus as described in relation to the figures and a first capsule and optionally a second capsule.

It will be appreciated that it is also possible to provide a second apparatus arranged for brewing a beverage using a second capsule, but incapable of brewing a beverage using a first capsule. Such second apparatus can be included in a system with the apparatus as described in relation to the figures and a second capsule and optionally a first capsule.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. An apparatus for preparing a quantity of beverage suitable for consumption, including:
    a first brew chamber part and a second brew chamber part forming a brew chamber for holding an exchangeable capsule, and a fluid dispensing device for supplying an amount of fluid, such as water, under pressure to the exchangeable capsule, wherein the first and the second brew chamber part are movable relative to each other between a first relative position, and a second relative position, wherein the first relative position defines an open state in which the capsule can be inserted into the brew chamber, wherein the second relative position defines a closed state allowing the brew chamber to enclose the capsule,
    a first biasing member being arranged for biasing the capsule towards the second brew chamber part, and a second biasing member being arranged for biasing the first brew chamber part and the second brew chamber part towards each other,
    wherein the first biasing member has a higher stiffness than the second biasing member.

2. The apparatus according to claim 1, wherein the first brew chamber part is movable between a first absolute position defining its loading position to be assumed in said first relative position with the second brew chamber part and a second absolute position defining its brewing position to be assumed in said second relative position with the second brew chamber part.

3. The apparatus according to claim 1, wherein the second brew chamber part is movable between a first absolute position defining its loading position to be assumed in said first relative position with the first brew chamber part and a second absolute position defining its brewing position to be assumed in said second relative position with the first brew chamber part.

4. The apparatus according to claim 1, wherein the first biasing member is a resilient element arranged on a bottom surface of the first brew chamber part inside a cavity defined by the first brew chamber part.

5. The apparatus according to claim 4, wherein the bottom surface of the first brew chamber part is provided with piercing means protruding in a direction away from the bottom surface.

6. The apparatus according to claim 5, wherein the first biasing member is part of the first brewing chamber part and in the open state biases the exchangeable capsule with its bottom free from said piercing means.

7. A system for preparing a quantity of beverage suitable for consumption, including the apparatus of claim 1 and at least one exchangeable capsule.

8. The system according to claim 7, wherein the at least one exchangeable capsule is a first exchangeable capsule and wherein the system at least comprises a second exchangeable capsule that differs from the first exchangeable capsule, the brew chamber being arranged for selectively holding one of the first and second exchangeable capsules.

9. The system according to claim 8, wherein said first exchangeable capsule and said second exchangeable capsule differ from each other in that a bottom of one of said first and said second exchangeable capsule has lower resistance to being pierced than a bottom of another one of said first exchangeable capsule and said second exchangeable capsule.

10. The system according to claim 9, wherein the first biasing member is at least partly formed by the bottom of one of said first exchangeable capsule and said second exchangeable capsule inserted in a cavity of the first brew chamber part and wherein the first biasing member including the bottom of the one of said first and said second exchangeable capsules having the lower resistance to being pierced has a higher stiffness than the second biasing member.

11. The system according to claim 8, wherein an axial length of the second exchangeable capsule is larger than an axial length of the first exchangeable capsule.

12. The system according to claim 8, wherein the second exchangeable capsule differs from the first exchangeable capsule in that the first exchangeable capsule has a first body with a first flange, and the second exchangeable capsule has a second body with a second flange, wherein the second flange has a larger diameter than the first flange.

13. The system according to claim 12, wherein the first brew chamber part has a cavity for selectively holding one of the first and second exchangeable capsules, the brew chamber part having a first annular abutment surface in the cavity, and the brew chamber part having a second annular abutment surface, wherein the first annular abutment surface is arranged for abutting the first flange thereagainst when the cavity holds the first exchangeable capsule, and wherein the second annular abutment surface is arranged for abutting the second flange thereagainst when the cavity holds the second exchangeable capsule.

14. The system according to claim 13, wherein the first annular abutment surface is spaced from the second annular abutment surface in an axial direction of the first brew chamber part, and wherein the first annular abutment surface and the second annular abutment surface are immobile relative to each other.

15. The system according to claim 13, wherein the second brew chamber part has an extraction plate for abutting against a first exit area of the first exchangeable capsule or a second exit area of the second exchangeable capsule, wherein the extraction plate includes a central portion and a peripheral portion, the central portion being movable relative to the peripheral portion.

16. The system according to claim 15, wherein the peripheral portion is arranged to abut against the second exit area when the cavity holds the second exchangeable capsule while brewing, and wherein the peripheral portion is arranged to abut against the first brew chamber part when the cavity holds the first exchangeable capsule while brewing.

17. The system according to claim 8, wherein the second exchangeable capsule being larger than the first exchangeable capsule, wherein the first brew chamber part includes a first volume not occupied by the first exchangeable capsule when the brew chamber holds the first exchangeable capsule, which first volume is arranged for holding part of the second exchangeable capsule when the brew chamber holds the second exchangeable capsule, and wherein the first brew chamber part includes a second volume not occupied by the second exchangeable capsule when the brew chamber holds the second exchangeable capsule, which second volume is arranged for receiving the second brew chamber part when the brew chamber holds the first exchangeable capsule.

18. The system according to claim 8, wherein the first and second exchangeable capsules have substantially the same length to diameter ratio.

19. The system according to claim 8, wherein the second exchangeable capsule being larger than the first exchangeable capsule, wherein the first brew chamber part and the first exchangeable capsule are adapted to each other such that a flange-like rim of the first exchangeable capsule engages an inner circumferential wall of the first brew chamber part when loading the first exchangeable capsule into the first brew chamber part, and wherein the first brew chamber part and the second exchangeable capsule are adapted to each other such that an outer part of the second exchangeable capsule engages the inner circumferential wall of the first brew chamber part when loading the second exchangeable capsule into the first brew chamber part.

* * * * *